United States Patent
Wallander

(10) Patent No.: US 12,280,688 B2
(45) Date of Patent: Apr. 22, 2025

(54) PORTABLE ELECTRICITY GENERATION SYSTEM AND METHOD OF USE

(71) Applicant: James Wallander, Keller, TX (US)

(72) Inventor: James Wallander, Keller, TX (US)

( * ) Notice: Subject to any disclaimer, the term of this patent is extended or adjusted under 35 U.S.C. 154(b) by 0 days.

(21) Appl. No.: 18/378,834

(22) Filed: Oct. 11, 2023

(65) Prior Publication Data

US 2024/0042879 A1 Feb. 8, 2024

Related U.S. Application Data

(63) Continuation of application No. 17/405,310, filed on Aug. 18, 2021, now Pat. No. 11,813,952.

(51) Int. Cl.
| | |
|---|---|
| *F03D 9/00* | (2016.01) |
| *B60K 16/00* | (2020.01) |
| *B60L 53/52* | (2019.01) |
| *F03D 9/11* | (2016.01) |
| *F03D 9/25* | (2016.01) |
| *F03D 9/32* | (2016.01) |

(52) U.S. Cl.
CPC .............. *B60L 53/52* (2019.02); *B60K 16/00* (2013.01); *F03D 9/11* (2016.05); *F03D 9/25* (2016.05); *F03D 9/32* (2016.05); *B60K 2016/006* (2013.01)

(58) Field of Classification Search
CPC .......... B60L 53/52; B60L 8/006; B60L 50/60; B60K 16/00; B60K 2016/006; F03D 9/11; F03D 9/25; F03D 9/32; F03D 3/02; F03D 3/0427; F05B 2250/132; F05B 2240/941; Y02E 10/728; Y02T 10/7072
See application file for complete search history.

(56) References Cited

U.S. PATENT DOCUMENTS

| | | | | |
|---|---|---|---|---|
| 3,556,239 | A * | 1/1971 | Spahn | B60K 17/04 180/2.2 |
| 8,169,182 | B1 | 5/2012 | Kimble | |
| 10,358,038 | B1 | 7/2019 | Ripley | |
| 10,814,728 | B2 | 10/2020 | Chang | |
| 2005/0046195 | A1* | 3/2005 | Kousoulis | F03D 9/00 290/44 |
| 2011/0031043 | A1 | 2/2011 | Armani et al. | |
| 2012/0056428 | A1 | 3/2012 | Bennett et al. | |

(Continued)

FOREIGN PATENT DOCUMENTS

| | | |
|---|---|---|
| KR | 100484117 B1 | 4/2005 |
| KR | 102155076 B1 | 9/2020 |
| WO | 9901919 A1 | 1/1999 |

OTHER PUBLICATIONS

Korean Patent Office, International Search Report and Written Opinion issued PCT/US2022/040531, Nov. 24, 2022, 13 pages.

*Primary Examiner* — Julio C. Gonzalez
(74) *Attorney, Agent, or Firm* — Barnes & Thornburg LLP; Jerry C. Harris, Jr.

(57) ABSTRACT

An electricity generator includes a wind tunnel positioned on the vehicle. The wind tunnel has an open first end and an open second end. The open first end is in communication with ambient air. A turbine chamber is fluidly coupled to the open second end of the wind tunnel. At least one wind turbine is positioned in the turbine chamber. The at least one wind turbine includes a housing. A rotor is positioned in the housing along an axis that is substantially perpendicular to an axis of the wind tunnel.

20 Claims, 19 Drawing Sheets

(56) References Cited

U.S. PATENT DOCUMENTS

| | | |
|---|---|---|
| 2015/0240786 A1 | 8/2015 | Dietzel |
| 2016/0195066 A1 | 7/2016 | Hu |
| 2017/0342964 A1* | 11/2017 | Cianflone ................. F03D 9/32 |
| 2019/0101102 A1* | 4/2019 | Yeo ........................... F03D 9/32 |
| 2019/0288635 A1 | 9/2019 | Schwertner et al. |

* cited by examiner

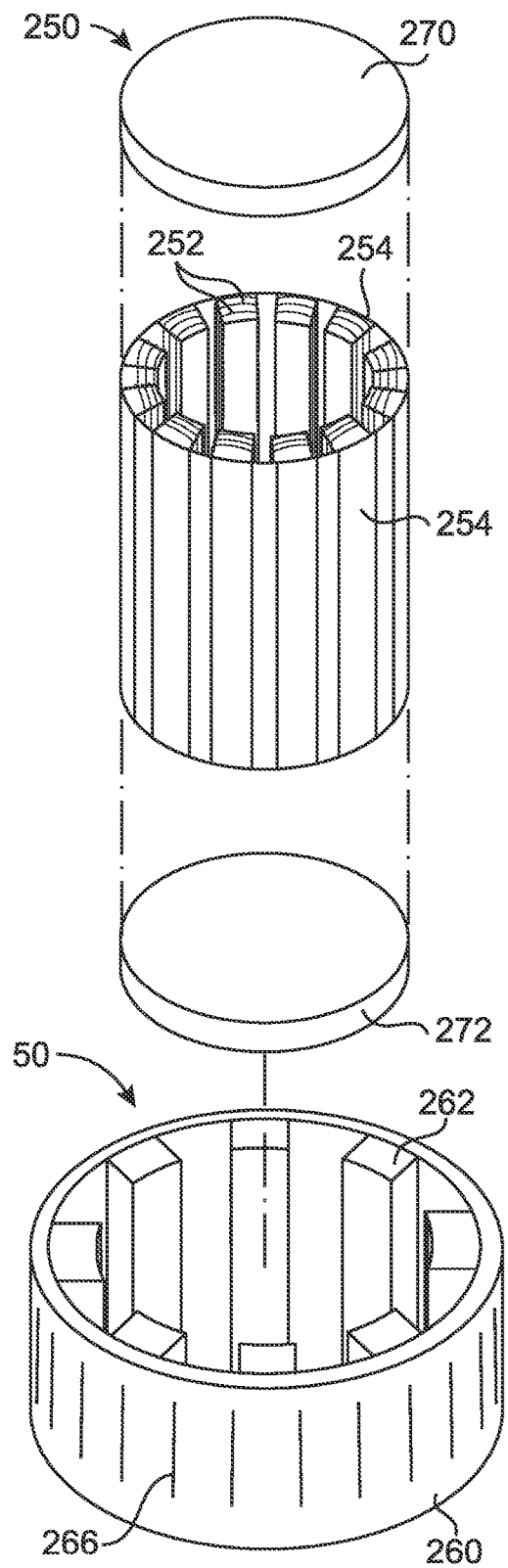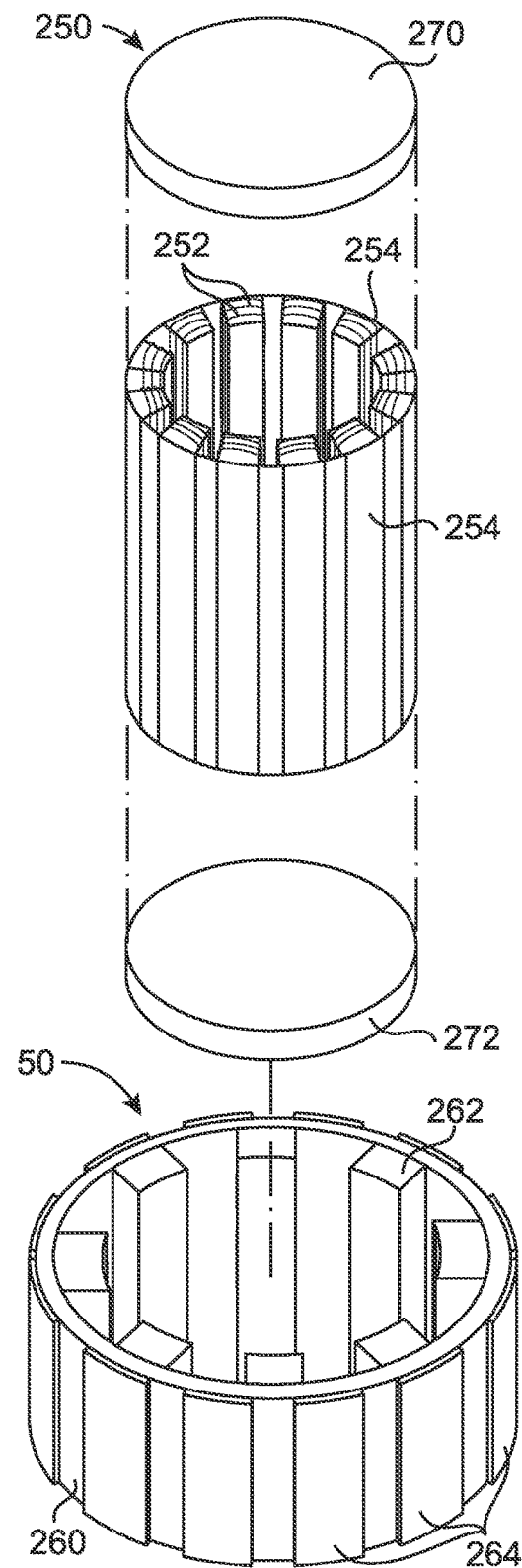

PORTABLE ELECTRICITY GENERATION SYSTEM AND METHOD OF USE

CROSS-REFERENCE TO RELATED APPLICATIONS

This application is a continuation of and claims priority to U.S. patent application Ser. No. 17/405,310 filed Aug. 18, 2021, which is incorporated herein by reference in its entirety.

BACKGROUND

The present invention relates generally to power generation systems and methods, and more specifically, to a portable electricity generation system that may be contained within a vehicle and converts wind passing by or over the vehicle to energy.

Power generation systems are well known in the art and are effective means to convert one form of energy to another such as the combustion of fuel to produce linear or rotational energy within an engine or motor. Commonly, power generation systems such as the motor or engine are included in vehicles to provide motive force thereto. Combustion engines that burn gasoline to move pistons within the engine are commonly used in motor vehicles. These vehicles also use electricity to power components of the vehicles, e.g. air conditioning.

Vehicles have also been developed that use electric motors to convert stored electricity in batteries to rotational energy that provides the motive force to the vehicle. The batteries contain all of the energy available to the vehicle. Hybrid vehicles or those that combine the use of gasoline engines with electric motors have also been developed.

One of the problems associated with common power generation systems is their limited efficiency. For example, a vehicle's range or distance that it is able to travel is limited by the amount of fuel carried thereby, additional fuel or energy is required to extend the range or continue the travel of the vehicle.

SUMMARY

The present disclosure includes one or more of the features recited in the appended claims and/or the following features, which, alone or in any combination, may comprise patentable subject matter.

According to a first aspect of the disclosed embodiments, an electricity generator for a vehicle includes a wind tunnel positioned on the vehicle. The wind tunnel has an open first end and an open second end. The open first end is in communication with ambient air. A turbine chamber is fluidly coupled to the open second end of the wind tunnel. At least one wind turbine is positioned in the turbine chamber. The at least one wind turbine includes a stator having an electrical coil. A rotor is positioned around the stator and extends along an axis that is substantially perpendicular to an axis of the wind tunnel. The rotor has at least one magnet. Ambient air enters the wind tunnel through the open first end and the wind tunnel channels the ambient air into the turbine chamber as funneled air in a direction that is substantially perpendicular to the axis of the rotor. The funneled air rotates the rotor to create an electrical charge between the electrical coil and the at least one magnet.

In some embodiments of the first aspect, the electrical charge may be delivered to a battery of the vehicle. The electrical charge may be delivered to a battery and stored in the battery.

Optionally, in the first aspect, at least one blade may be coupled to the rotor. The funneled air may create a force against the at least one blade to rotate the rotor. The wind tunnel may include a filter having a plurality of openings in a honeycomb pattern. A portion of the wind tunnel may be curved between a first end and a second end.

It may be desired, in the first aspect, that the at least one wind turbine may include a plurality of wind turbines. The plurality of wind turbines may include a first wind turbine and a second wind turbine that is offset from the first wind turbine relative to the axis of the wind tunnel. The plurality of wind turbines may include a first wind turbine positioned at a first height and a second wind turbine positioned at a second height that is greater than the first height. The second wind turbine may be positioned downstream of the first wind turbine.

It may be contemplated, in the first aspect, that the generator may be retrofit onto an existing vehicle. The wind tunnel may be positioned at a front end of the vehicle. The wind tunnel may be positioned along a side of the vehicle. The wind tunnel may be positioned on an undercarriage of the vehicle. In an embodiment, a vehicle may comprise a plurality electricity generators which are positioned as described herein.

In some embodiments of the first aspect, the wind turbine may facilitate reducing gravitational friction between the rotor and the housing using magnetic force. The wind turbine may facilitate increasing rotational velocity and duration of rotation of the rotor to facilitate increasing the generation of electrical charge. The wind tunnel may facilitate increasing a velocity of the funneled air.

Optionally, in the first aspect, panels may be positioned on the open first end of the wind tunnel. The panels may be movable to adjust a flow of the ambient air into the wind tunnel. Sensors may control movement of the panel. The panels may be moved to an open position when the vehicle is at least one of braking or not accelerating.

In some embodiments of the first aspect, the electricity generator may also be configured for delivering electricity generated by the electricity generator to a power grid. The electricity generator may also be configured for delivering electricity generated by the electricity generator to a third party power receiver.

According to a second aspect of the disclosed embodiments, a method of utilizing energy produced by an electricity generator includes collecting ambient air through an open end of a wind tunnel. The method also includes funneling the ambient air into a turbine chamber as funneled air. The turbine chamber includes at least one wind turbine, wherein the at least one wind turbine includes a stator having an electrical coil and a rotor positioned around the stator and extending along an axis that is substantially perpendicular to an axis of the wind tunnel. The rotor has at least one magnet. The method also includes passing the funneled air along the rotor in a direction that is substantially perpendicular to the axis of the rotor. The method also includes rotating the rotor with the funneled air to create an electrical charge between the electrical coil and the at least one magnet. The method also includes storing the electrical charge in a battery.

In some embodiments of the second aspect, the wind tunnel and the turbine chamber maybe positioned on a vehicle. The method may include collecting the ambient air while the vehicle is moving. The method may also include positioning the wind tunnel at a front end of the vehicle. The method may also include positioning the wind tunnel along a side of the vehicle. The method may also include positioning the wind tunnel on an undercarriage of the vehicle.

The method may also include collecting the ambient air when the vehicle is at least one of braking or not accelerating.

In some embodiments of the second aspect, the wind tunnel may comprise a preexisting structure and/or structures, e.g., a building, a series of buildings, and/or the fluid passageways there between. In an embodiment, the turbine chamber is placed/located on a preexisting structure.

Optionally, in the second aspect, the method may also include winding the metallic wire around the rotor and coupling the at least one magnet to an inner surface of the housing. The method may also include winding the metallic wire around an inner surface of the housing and coupling the magnet to the rotor. The method may also include reducing gravitational friction between the rotor and the housing using magnetic force. The method may also include increasing rotational velocity and duration of rotation of the rotor to facilitate increasing the generation of electrical charge. The method may also include increasing a velocity of the funneled air with the wind tunnel. The method may also include moving panels on the open end of the wind tunnel to adjust a flow of the ambient air into the wind tunnel. The method may also include controlling the movement of the panels with a sensor. The method may also include delivering electricity generated by the electricity generator to a power grid. The method may also include delivering electricity generated by the electricity generator to a third party power receiver.

According to a third aspect of the disclosed embodiments, an electricity generator includes a wind tunnel having an open first end and an open second end. In an embodiment, the wind tunnel may comprise a preexisting structure and/or structures, e.g., a building, a series of buildings, and/or the fluid passageways there between. The open first end is in communication with ambient air. A turbine chamber is fluidly coupled to the open second end of the wind tunnel. In an embodiment, the wind tunnel comprises a plurality of turbine chambers. In an embodiment, the turbine chamber is placed/located on a preexisting structure. At least one wind turbine is positioned in the turbine chamber. The at least one wind turbine includes a stator having an electrical coil. A rotor is positioned around the stator and extends along an axis that is substantially perpendicular to an axis of the wind tunnel. The rotor has at least one magnet. Ambient air enters the wind tunnel through the open first end and the wind tunnel channels the ambient air into the turbine chamber as funneled air in a direction that is substantially perpendicular to the axis of the rotor. The funneled air rotates the rotor to create an electrical charge between the electrical coil and the at least one magnet.

In some embodiments of the third aspect, the electrical charge may be delivered to a battery and stored in the battery. The metallic wire may be wound around the rotor and the at least one magnet may be coupled to an inner surface of the housing. The metallic wire may be wound around an inner surface of the housing and the magnet may be coupled to the rotor. At least one blade may be coupled to the rotor. The funneled air may create a force against the at least one blade to rotate the rotor. The wind tunnel may include a filter having a plurality of openings in a honeycomb pattern. A portion of the wind tunnel may be curved between a first end and a second end.

Optionally, in the third aspect, the at least one wind turbine may include a plurality of wind turbines. The plurality of wind turbines may include a first wind turbine and a second wind turbine that is offset from the first wind turbine relative to the axis of the wind tunnel. The plurality of wind turbines may include a first wind turbine positioned at a first height and a second wind turbine positioned at a second height that is greater than the first height. The second wind turbine may be positioned downstream of the first wind turbine.

It may be desired, in the third aspect, that the wind turbine may facilitate reducing gravitational friction between the rotor and the housing using magnetic force. The wind turbine may facilitate increasing rotational velocity and duration of rotation of the rotor to facilitate increasing the generation of electrical charge. The wind tunnel may facilitate increasing a velocity of the funneled air.

In some embodiments of the third aspect, panels may be positioned on the open first end of the wind tunnel. The panels may be movable to adjust a flow of the ambient air into the wind tunnel. Sensors may control movement of the panels.

In some embodiments of the third aspect, the electricity generator may also be configured for delivering electricity generated by the electricity generator to a power grid. The electricity generator may also be configured for delivering electricity generated by the electricity generator to a third party power receiver.

In an embodiment, the energy generated by the electricity generators described herein may be converted into carbon credits and traded on available carbon credit trading exchanges.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which:

FIG. 7 is an exploded view of an embodiment of a wind turbine in accordance with an embodiment;

FIG. 8 is an exploded view of an embodiment of a wind turbine in accordance with an embodiment;

DETAILED DESCRIPTION

Figure 1:
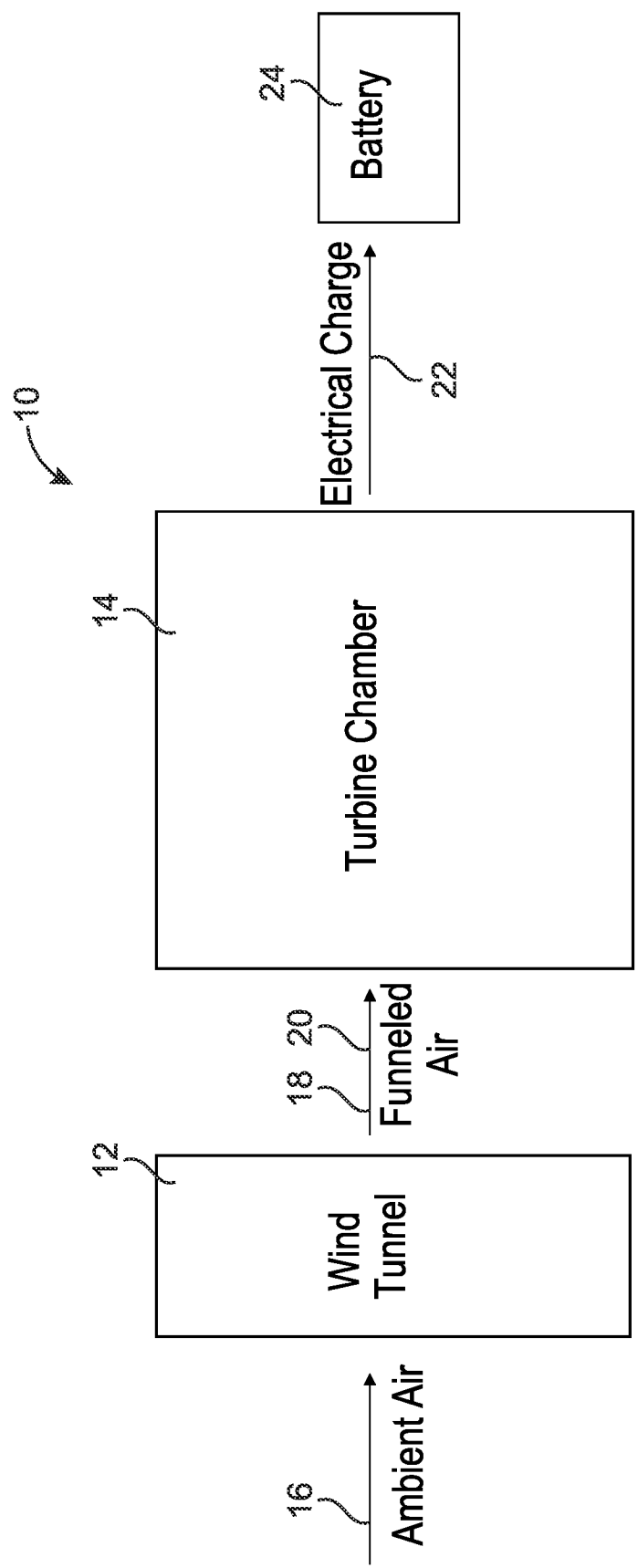
FIG. 1 is a block diagram of an electricity generator in accordance with an embodiment.

Referring to FIG. 1, a portable electricity generator 10 includes a wind tunnel 12 in fluid communication with a turbine chamber 14. The wind tunnel 12 collects ambient air 16 and funnels the ambient air 16 into funneled air 18. The funneled air 18 is discharged from the wind tunnel 12 along an axis 20. The funneled air 18 is passed through the turbine chamber 14, where the funneled air 18 is converted to an electrical charge 22. The electrical charge 22 is transmitted to and stored in a battery 24.

Figure 2:
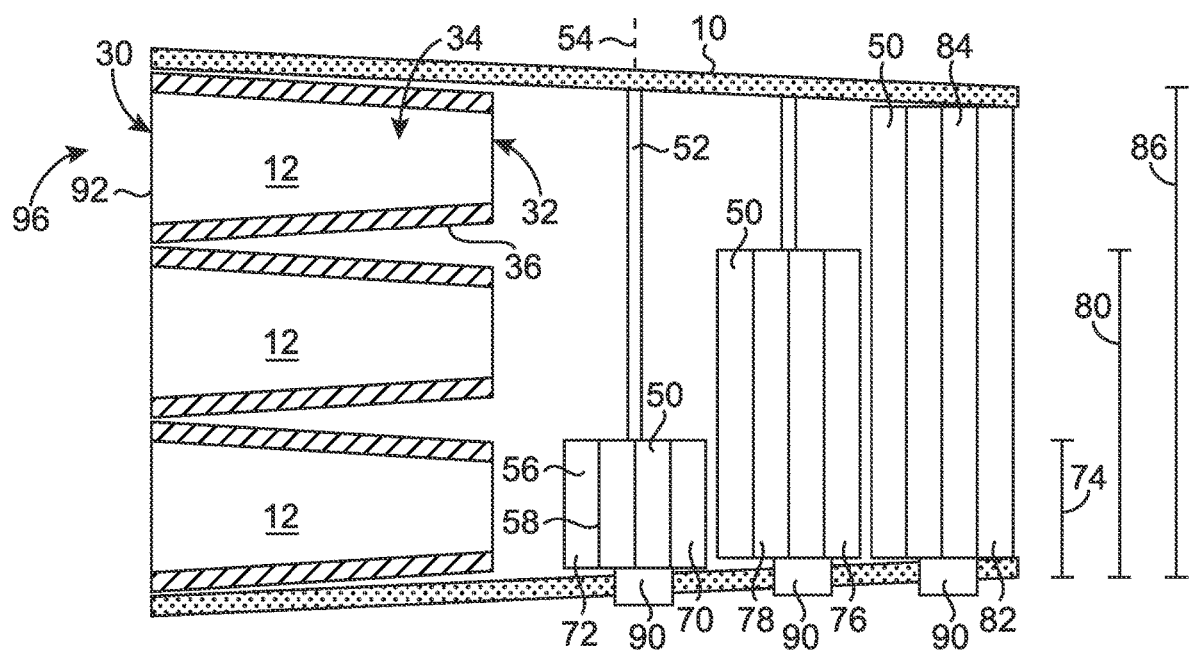
FIG. 2 is a block diagram of a turbine chamber of the electricity generator shown in FIG. 1 with panels of the wind tunnel in a closed position.
Figure 3:
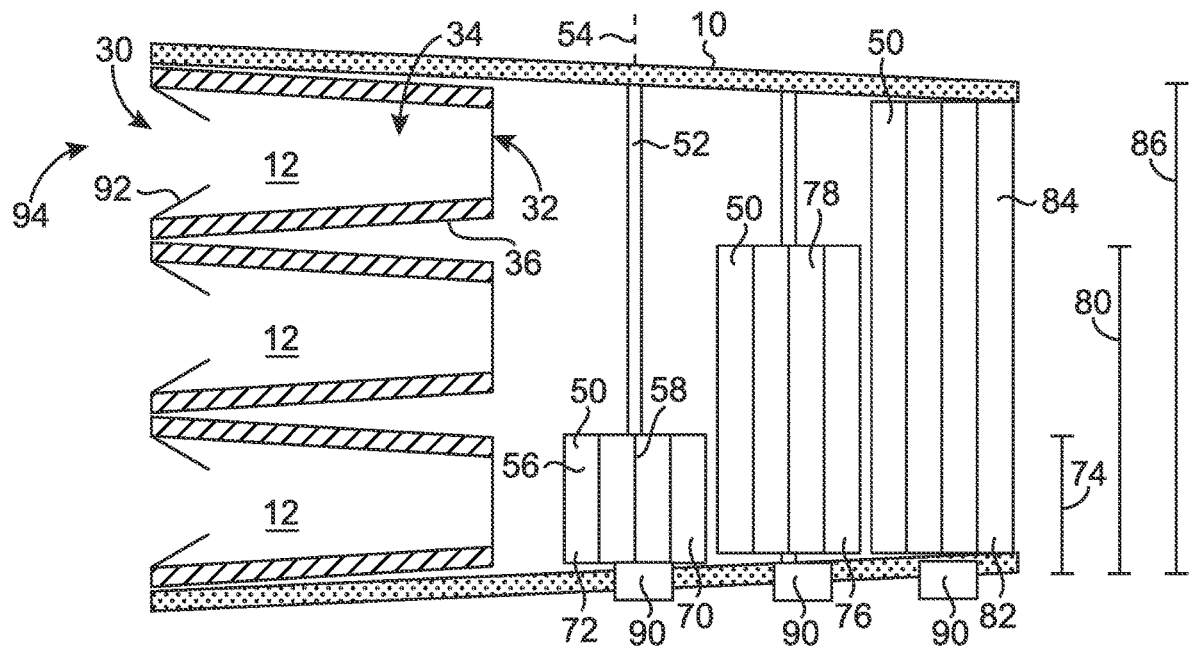
FIG. 3 is a block diagram of a turbine chamber of the electricity generator shown in FIG. 1 with the panels of the wind tunnel in an open position.

FIGS. 2 and 3 illustrate details of the electricity generator 10. The generator 10 includes three wind tunnels 12, but may include any number of wind tunnels 12. Each wind tunnel 12 includes an entry 30 configured as an open end and an exit 32 configured as another opposite open end. A cavity 34 extends between the entry 30 and the exit 32. The ambient air 16 is funneled through the cavity 34 into the funneled air 18 that is discharged from the exit 32 along the axis 20. In the illustrative embodiment, the wind tunnel 12 includes a sidewall 36 that extends between the entry 30 and the exit 32. The sidewall 36 is generally conical in shape to funnel the ambient air 16 into the funneled air 18. In some embodiments, the sidewall 36 may have any shape suitable for funneling the ambient air 16 along the axis 20. In some embodiments, a portion of the sidewall 36 is curved between the entry 30 and the exit 32. The wind tunnel 12 may include a narrowing funnel so the wind force increases as it goes through the wind tunnel. Each turbine chamber 14 is a unit or pod that can be replaced by another pod if damaged or broken.

A plurality of wind turbines 50 are positioned within the turbine chamber 14. The illustrative embodiment includes three wind turbines 50; however, it will be appreciated that the generator 10 may include any number of wind turbines 50. Each wind turbine 50 includes a shaft 52 that extends along an axis 54 that is angled relative to the axis 20 of the funneled air 18. The shaft 52 includes a stator, as described below. In an exemplary embodiment, the shaft 52 extends substantially vertically. In some embodiments, the axis 54 of the shaft 52 is relatively perpendicular to the axis 20 of the funneled air 18. A rotor 56 extends circumferentially around the shaft 52 and the corresponding stator. The funneled air 18 is configured to create a force against the rotor 56 so that the rotor 56 rotates about the shaft 52 about the axis 54. As shown in FIGS. 2 and 3, the rotor 56 includes a plurality of blades 58.

In the illustrative embodiment, a first wind turbine 70 includes a rotor 72 having a height 74. A second wind turbine 76 positioned downstream of the first wind turbine 70 includes a rotor 78 having a height 80 that is greater than the height 74. A third wind turbine 82 positioned downstream of the second wind turbine 76 includes a rotor 84 having a height 86 that is greater than the height 80. It should be noted that FIGS. 2 and 3 illustrate only an exemplary embodiment of an arrangement of wind turbines 50.

A sensor 90 is coupled to each wind turbine 50 to measure a rotational speed of the wind turbine 50. In some embodiments, the sensor 90 is coupled to only some of the wind turbines 50. In other embodiments, the sensor 90 is not coupled to a wind turbine 50, but rather, is positioned within the turbine chamber 14 to measure a velocity of the funneled air 18. The sensor 90 is electrically coupled to panels 92 at the entry 30 of each wind tunnel 14. The sensor 90 transmits signals to the panels 92 to control the operation of the panel 92 by moving the panels 92 between an open position 94, shown in FIG. 3, and a closed position 96, shown in FIG. 2, to control the flow of ambient air 16 into the wind tunnel 14 based on the measurements made by the sensor 90. In some embodiments, the panels 92 are opened to a position between the open position 94 and the closed position 96 based on the measurements made by the sensor 90.

Figure 4:
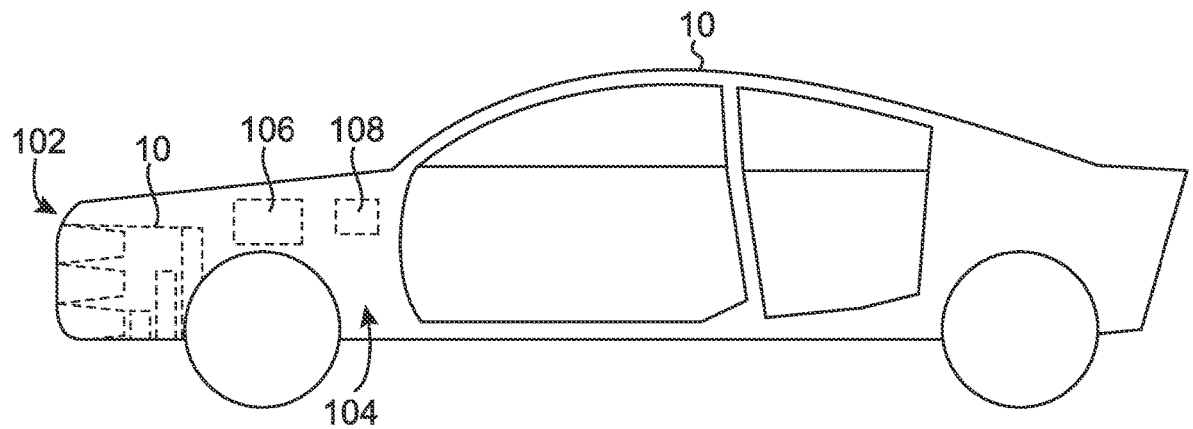
FIG. 4 is a schematic diagram of the electricity generator shown in FIG. 1 positioned on a vehicle.

Referring now to FIG. 4, the generator 10 may be positioned in a vehicle 100. Although the vehicle 100 is illustrated as a car, it should be understood that the vehicle 100 may be any vehicle includes a truck, a motorcycle, a boat, a train, an airplane, etc. In some embodiments, the generator 10 is position at a front 102 of the vehicle 100, for example behind an air intake or below the undercarriage. The generator 10 may also be positioned along a side 104 of the vehicle 100 and include an air intake to direct the ambient air 16 into the wind tunnel 14. It will be appreciated that, in other configurations, the generator 10 may be positioned on any location of the vehicle 100.

As the vehicle 100 moves, the ambient air 16 around the vehicle 100 is collected in the wind tunnel 14. In some embodiments, a sensor 108 of the vehicle 100 may be configured to measure a rate of speed of the vehicle 100 and operate the panels 92 based on the rate of speed of the vehicle 100. In an exemplary embodiment, the panels 92 are opened when the vehicle 100 is braking or decelerating. In some embodiments, the panels 92 are opened to a positioned between the open position 94 and the closed position 96 based on a rate of speed of the vehicle 100.

The generator 10 is electrically connected to a battery 106 of the vehicle 100. The generator 10 generates electricity that is stored in the battery 106. In some embodiments, the battery 106 is the operational battery of the vehicle 100. In other embodiments, the battery 106 is a separate battery that stores the electricity for future use. For example, the stored electricity may be transferred to a power grid. In other embodiments, the battery having stored electricity may be used to power other devices.

Figure 5:
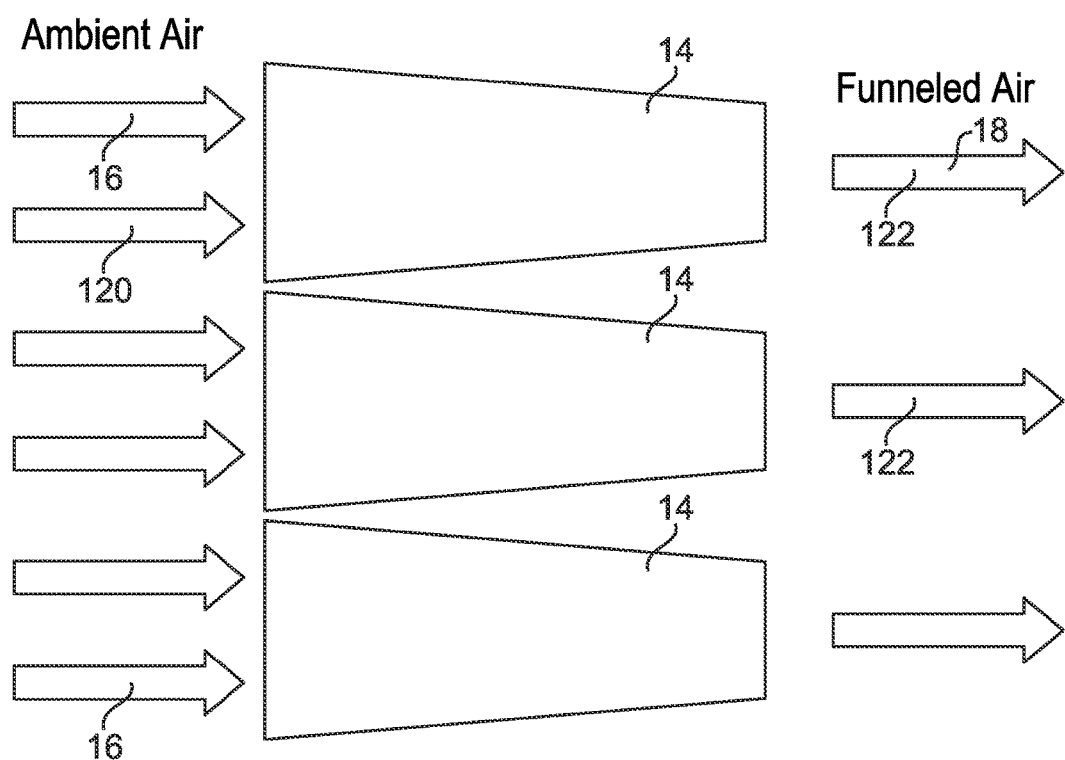
FIG. 5 is a block diagram of airflow through the wind tunnel shown in FIG. 1.

FIG. 5 illustrates three wind tunnels 14 configured to capture ambient air 16 traveling along paths 120. Although the paths 120 are illustrated a straight paths, it will be appreciated that the ambient air 16 may be traveling along any path and may be swirling as the ambient air 16 enters each wind tunnel 14. Each wind tunnel 14 produces a flow of funnel air 18. The wind tunnel 14 funnels the ambient air 16 to generate a path 122 of funneled air exiting each wind tunnel 14 along an axis 20.

Figure 6:
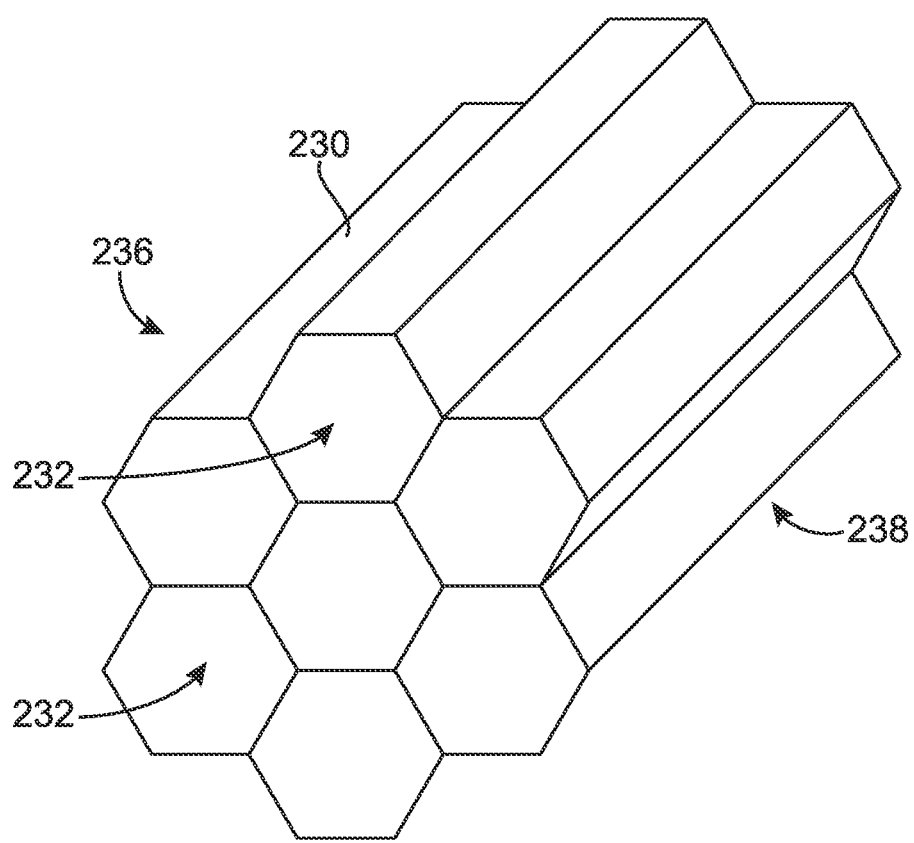
FIG. 6 is a perspective view of a honeycomb filter utilized with the wind tunnel shown in FIG. 1.

In some embodiments, the wind tunnel 14 includes a honeycomb configuration 230, as illustrated in FIG. 6. The honeycomb configuration 230 includes a plurality of hexagonal channels 232, wherein each channel 232 is configured to produce a separate path 122 of funneled air 18 exiting the honeycomb configuration 230. In some embodiments, the honeycomb configuration 230 includes a plurality of channels having any shape, wherein the channels are separated but cooperate to produce the funneled air 18. In some embodiments, the entire wind tunnel 14 is configured in the honeycomb configuration 230. In other embodiments, the wind tunnel 14 includes a filter positioned at the entry 30. In such embodiments, the filter may include the honeycomb configuration 230. In some embodiments, a portion of the honeycomb configuration 230 may be curved between a first end 236 and a second end 238.

Referring now to FIGS. 7 and 8, the wind turbine 50 includes a stator 250 including a plurality of magnets 254 positioned on a surface of the stator 250. An electrical coil 252 is positioned behind each magnet 254 inside of the stator 250. A rotor 260 is configured to position around the stator 250. A plurality of magnets 262 are positioned on an inner surface of the rotor 260. In FIG. 7, the outer surface of the rotor 260 includes a contoured surface 266 having a pattern of indentations 266 and/or small disks that are configured to maximize the capture the airflow without using blades. In another embodiment, shown in FIG. 8, a plurality of blades 264 extend from the outer surface of the rotor 260 to capture airflow. The rotor 260 is configured to rotate around the stator 250 so that the magnets 254 and 262 create an electrical charge that is transferred to the electrical coil 252. The electrical coil 252 generates electricity from the rotation of the rotor 260. As used herein, the term "magnet" refers to any electro-magnet or rare-earth magnet utilized to generate a magnetic force. The magnets described herein may be formed from any material capable of producing a magnetic force.

The wind turbine 50 also includes a top magnet 270 positioned on a first end of the wind turbine 50 and a bottom magnet 272 positioned on a second end of the wind turbine 50. The rotor 260 is configured to rotate around the stator 250 with the top magnet 270 and the bottom magnet 272 in magnetic communication with the surface of the rotor 260 so that the rotor 260 floats relative to the stator 250. The rotor 260 is magnetically suspended between the top magnet 270 and the bottom magnet 272 relative to the stator 250. It is contemplated that magnets could be attached to the surface of the rotor 260 or otherwise located to interact with the magnetic field of the top magnet 270 and the bottom magnet 272.

In use, the vehicle 100 travels along under its own motive power. This could be by gasoline, electric power, or the like. Ambient air 16 is allowed to enter the wind tunnel 14 and is channeled as funneled air 18 to the wind turbine 50. Force against the surface of the rotor 260 causes the rotation of the rotor 260 and thereby the generation of electricity through the generator 10. The top magnet 270 and bottom magnet 272 ensure that the rotor 260 rotates with minimal friction. It should be appreciated that one of the unique features believed characteristic of the present application is that the wind turbine 50 converts air passing thereby to electricity that is available for the vehicle 100 to use.

In some embodiments, the generator 10 is a frictionless magnetic electricity generator. The electrical coil 252 and magnets 254, 262 generate the electricity as the magnets 262 spin. The magnets 262 are constantly spinning due to reduced friction. The honeycomb and other surface structures maximize the wind capture to facilitate maximizing the spinning speed of the wind turbine 50. A series of wind turbines 50 may be provided in the generator 10 and may be offset to facilitate minimum wind resistance.

Artificial Intelligence and/or sensors in the vehicles computer system may open the wind tunnel 12 during braking and non-accelerating driving times. During accelerating driving time the wind tunnel 12 is closed however, the wind turbines 50 may still be spinning due to the near frictionless environment created by magnets 254, 262. The generator 10 facilitates minimizing drag/friction of the wind turbines 50 so that the only added component is the weight of the wind turbine 50. If the same amount of weight or more can be removed elsewhere from the vehicle 100 to create a net gain in energy produced. The electricity produced may be used to either replace the energy being used by another battery system or to regenerate new electricity in the battery system. In some embodiments, all of the electrical wires from the generators 10 connect to one wire that provides electricity for use or storage. It will be appreciated that the wind turbine 50 may be utilized without the vehicle 100, as described in more detail below.

Figure 9:
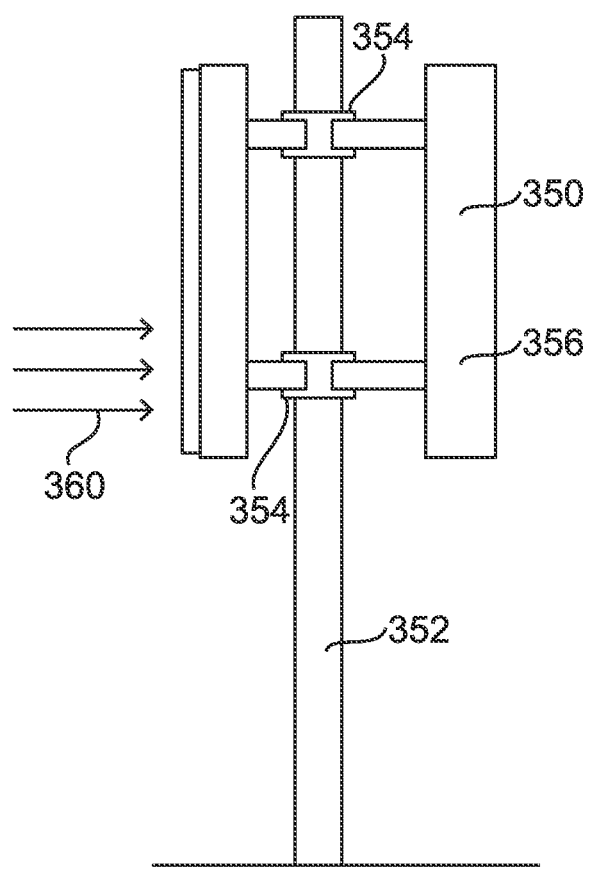
FIG. 9 is a side view of yet another embodiment of a wind turbine in accordance with an embodiment.

It is contemplated that other embodiments enable the use of the wind turbine in other environments such as freestanding or attached to buildings, structures and the like. As depicted by FIG. 9 a set of blades 350 is attached to a rotor 352 via magnetic bushings 354. Each blade in the set of blades 350 has a wind surface 356 and is configured to maximize the rotation thereof about the rotor 352. The rotor 352 is attached to a support surface such as the ground or a structure. The set of blades 350 capture an airflow 360 as it passes thereby. The blades could be offset from the shaft rotor 352 or each blade may be a continuous wind surface 356 integral with the rotor 352.

Figure 10:
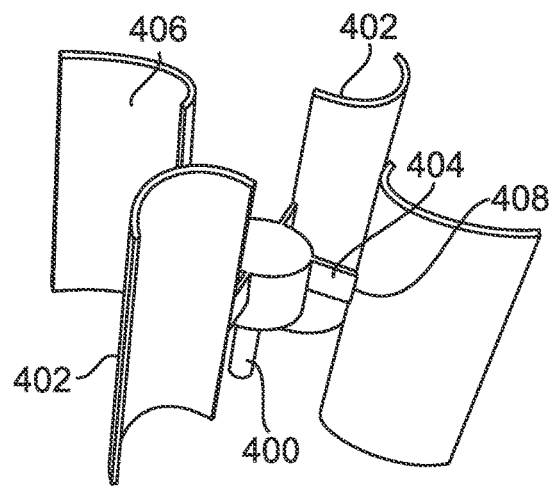
FIG. 10 is a side view of an embodiment of blades of a wind turbine in accordance with an embodiment.

FIGS. 10-13 illustrate various embodiments of wind turbines 50. FIG. 10 illustrates a rotor 400 having a plurality of blades 402 extending therefrom. The illustrative embodiment includes four blades 402; however, the rotor 400 may include any number of blades 402. Each blade 402 includes a stem 404 that extends at an angle from the rotor 400. In some embodiments, each stem 404 may extend at a perpendicular angle from the rotor 400. A wind-surface 406 extends from a cantilevered end 408 of each stem 404. The wind surface 406 is illustrated as being curved; however, it will be appreciated that the wind surface 406 may be planar or take other shapes.

Figure 11:
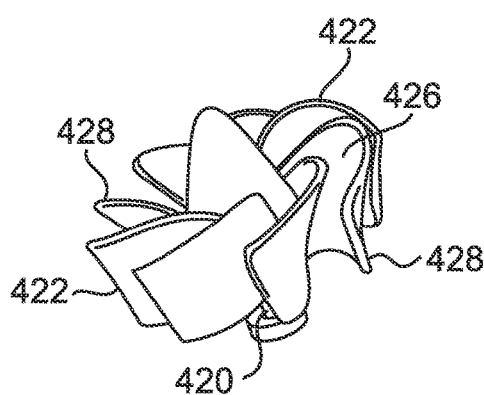
FIG. 11 is a side view of another embodiment of blades of a wind turbine in accordance with an embodiment.

FIG. 11 illustrates a rotor 420 having a plurality of blades 422 extending therefrom. The illustrative embodiment includes eight blades 422; however, the rotor 420 may include any number of blades 422. Each blade 402 includes a wind surface 426 extending to a cantilevered end 428. The wind surface 426 is curved an angled to overlap an adjacent blade 402.

Figure 12:
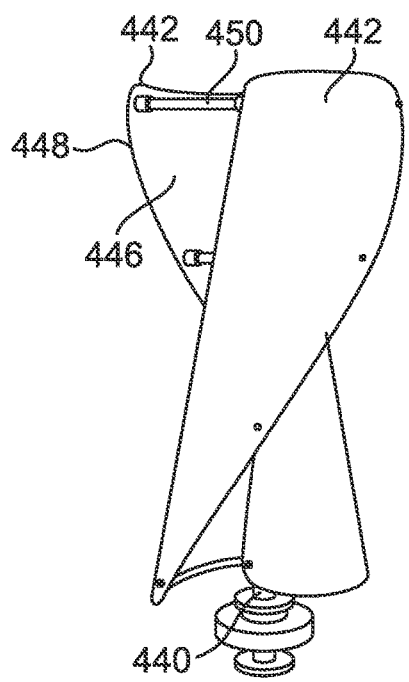
FIG. 12 is a side view of yet another embodiment of blades of a wind turbine in accordance with an embodiment.

FIG. 12 illustrates a rotor 440 having a plurality of blades 442 extending therefrom. The illustrative embodiment includes two blades 442; however, the rotor 440 may include any number of blades 442. Each blade 442 includes a wind surface 446 extending to a cantilevered end 448. The cantilevered end 448 of each blade 442 is coupled to the rotor 440 by a stem 450. The wind-surface 446 is curved an angled to overlap an adjacent blade 442.

Figure 13:
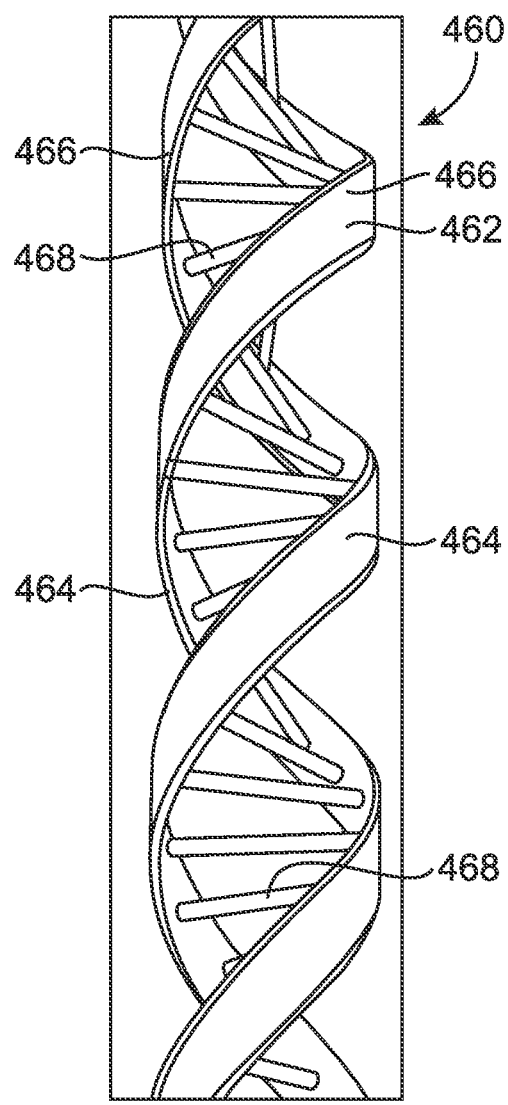
FIG. 13 is a side view of a further embodiment of blades of a wind turbine in accordance with an embodiment.

FIG. 13 illustrates a wind turbine 460 having a double-helix blade 462. The double-helix blade 462 includes two helix blades 464 that twist around the rotor 460. Each blade 464 include a wind surface 466. The blades 464 are coupled to one another by a plurality of stems 468 that extend between the two blades 464.

Figure 14:
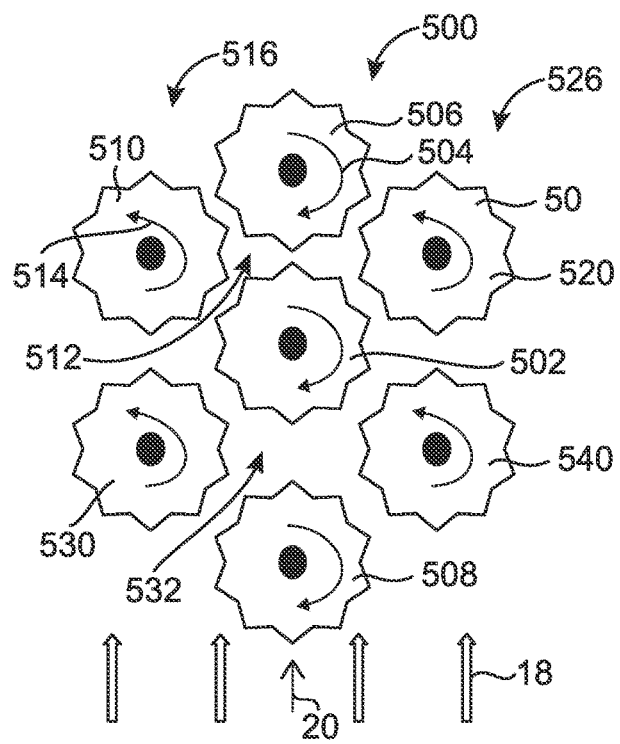
FIG. 14 is a top view of another embodiment of a wind turbine arrangement in accordance with an embodiment.

Referring now to FIG. 14, an arrangement 500 of wind turbines 50 includes a center turbine 502 that rotates in a first rotational direction 504. In the exemplary embodiment, the first rotational direction 504 is clockwise. A back turbine 506 is positioned downstream of the center turbine 502 and aligned with the center turbine 502 along the axis 20 of the funneled air 18. The back turbine 506 also rotates in the first rotational direction 504. A front turbine 508 is positioned upstream of the center turbine 502 and aligned with the center turbine 502 along the axis 20 of the funneled air 18. The front turbine 508 also rotates in the first rotational direction 504.

A left back turbine 510 is offset to a left side 516 of the center turbine 502 relative to the axis 20 of the funneled air 18. The left back turbine 510 is aligned with a space 512 between the center turbine 502 and the back turbine 506. The left back turbine 510 rotates in a second rotational direction 514 that is opposite the first rotational direction 514. In the exemplary embodiment, the second rotational direction 504 is counter-clockwise. A right back turbine 520 is offset to a right side 526 of the center turbine 502 relative to the axis 20 of the funneled air 18. The right back turbine 520 is aligned with the space 512 between the center turbine 502 and the back turbine 506. The right back turbine 520 rotates in the second rotational direction 514.

A left front turbine 530 is offset to the left side 516 of the center turbine 502 relative to the axis 20 of the funneled air 18. The left front turbine 510 is aligned with a space 532 between the center turbine 502 and the front turbine 508. The left front turbine 530 rotates in the second rotational direction 514. A right front turbine 540 is offset to the right side 526 of the center turbine 502 relative to the axis 20 of the funneled air 18. The right front turbine 540 is aligned with the space 532 between the center turbine 502 and the front turbine 508. The right front turbine 540 rotates in the second rotational direction 514.

Figure 15:
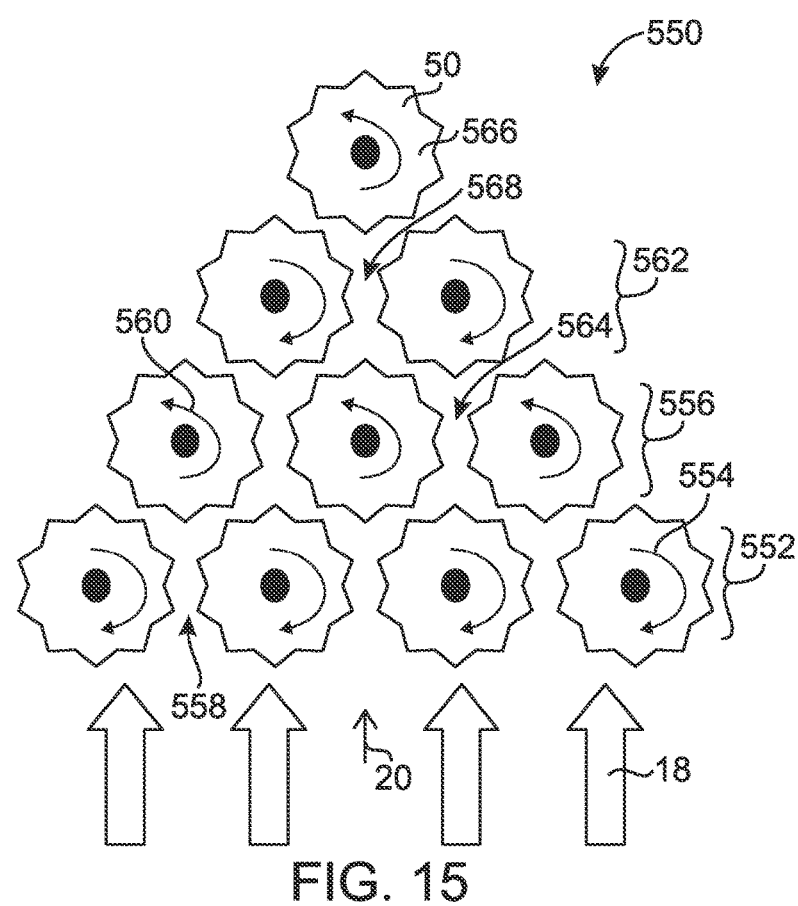
FIG. 15 is a top view of yet another embodiment of a wind turbine arrangement in accordance with an embodiment.

FIG. 15 illustrates an arrangement 550 of wind turbines 50 that includes a front row 552 having four wind turbines 50 aligned perpendicular to the axis 20 of the funneled air 18. Each of the wind turbines 50 in the front row 552 rotates in a first rotational direction 554. In the exemplary embodiment, the first rotation direction 554 is clockwise. A second row 556 downstream of the front row 552 includes three wind turbines 50 aligned perpendicular to the axis 20 of the funneled air 18. Each wind turbine 50 in the second row 556 is offset from a turbine 50 in the front row 552 and aligned relative to the axis 20 of the funneled air 18 with a space 558 centered between adjacent wind turbines 50 in the front row 552. Each of the wind turbines 50 in the second row 556 rotates in a second rotational direction 560 that is opposite the first rotational direction 554. In the exemplary embodiment, the second rotation direction 560 is counter-clockwise.

A third row 562 downstream of the second row 556 includes two wind turbines 50 aligned perpendicular to the axis 20 of the funneled air 18. Each turbine 50 in the third row 562 is offset from a turbine 50 in the second row 556 and aligned relative to the axis 20 of the funneled air 18 with a space 564 centered between adjacent wind turbines 50 in the second row 556. Each of the wind turbines 50 in the third row 562 rotates in the first rotational direction 554. A back wind turbine 566 downstream of the third row 562 is offset from both turbines 50 in the third row 562 and aligned relative to the axis 20 of the funneled air 18 with a space 568 centered between the wind turbines 50 in the third row 562. The back wind turbine 566 rotates in the second rotational direction 560.

Figure 16:
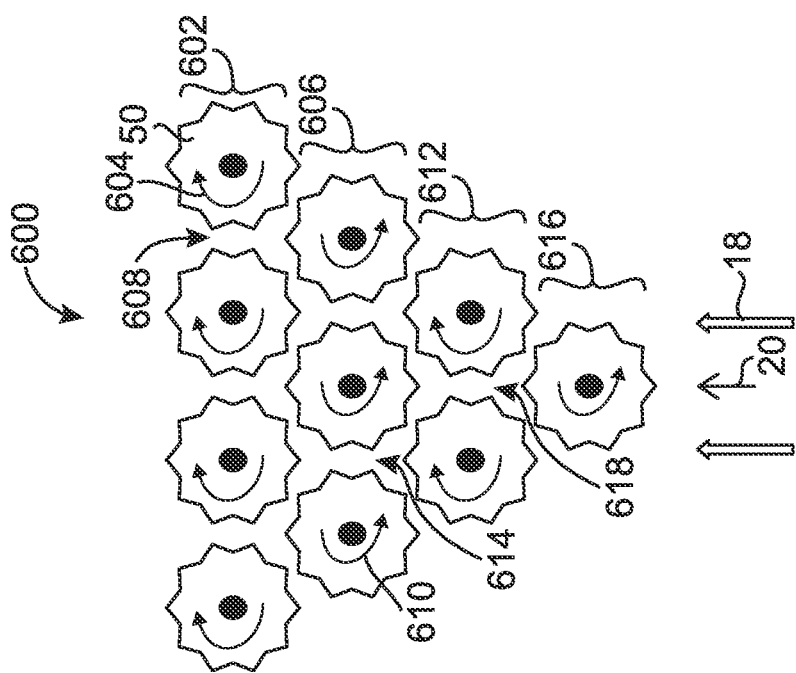
FIG. 16 is a top view of a further embodiment of a wind turbine arrangement in accordance with an embodiment.

FIG. 16 illustrates another arrangement 600 of wind turbines 50 that includes a back row 602 having four wind turbines 50 aligned perpendicular to the axis 20 of the funneled air 18. Each of the wind turbines 50 in the back row 602 rotates in a first rotational direction 604. In the exemplary embodiment, the first rotation direction 604 is clockwise. A second row 606 upstream of the back row 602 includes three wind turbines 50 aligned perpendicular to the axis 20 of the funneled air 18. Each turbine 50 in the second row 606 is offset from a turbine 50 in the back row 602 and aligned relative to the axis 20 of the funneled air 18 with a space 608 centered between adjacent wind turbines 50 in the back row 602. Each of the wind turbines 50 in the second row 606 rotates in a second rotational direction 610 that is opposite the first rotational direction 604. In the exemplary embodiment, the second rotation direction 610 is counter-clockwise.

A third row 612 upstream of the second row 606 includes two wind turbines 50 aligned perpendicular to the axis 20 of the funneled air 18. Each turbine 50 in the third row 612 is offset from a turbine 50 in the second row 606 and aligned relative to the axis 20 of the funneled air 18 with a space 614 centered between adjacent wind turbines 50 in the second row 606. Each of the wind turbines 50 in the third row 612 rotates in the first rotational direction 604. A front wind turbine 616 upstream of the third row 612 is offset from both turbines 50 in the third row 612 and aligned relative to the axis 20 of the funneled air 18 with a space 618 centered between the wind turbines 50 in the third row 612. The front wind turbine 616 rotates in the second rotational direction 610.

Figure 17:
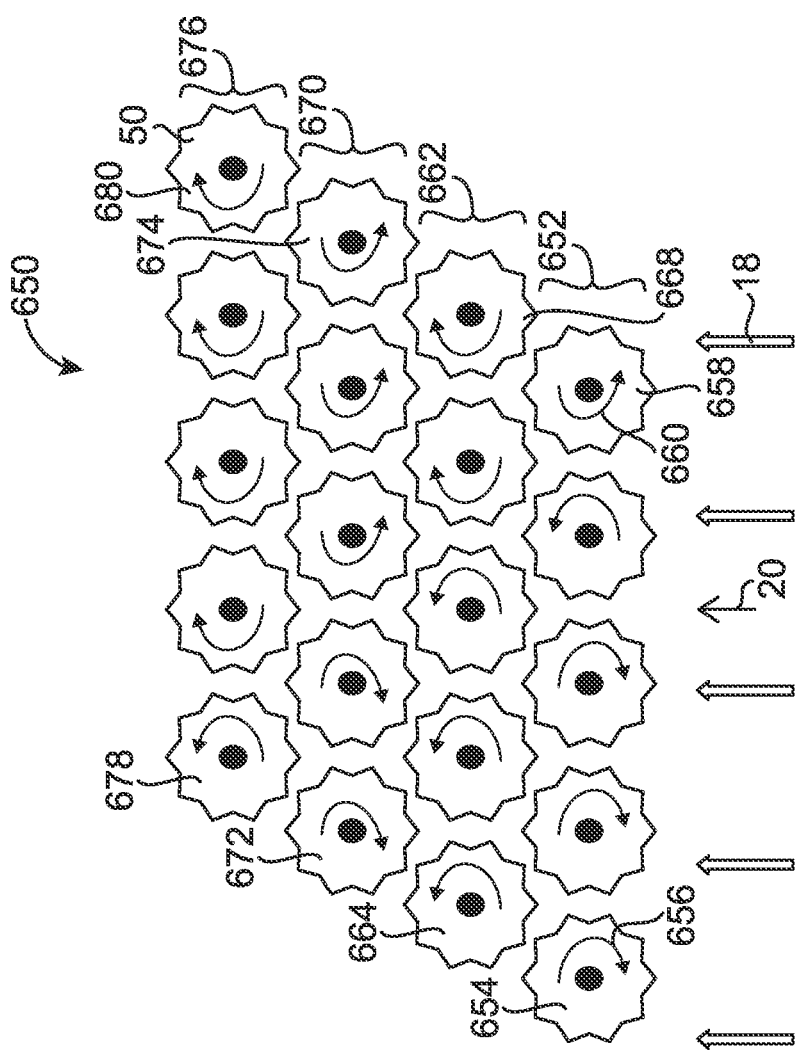
FIG. 17 is a top view of an embodiment of a wind turbine arrangement in accordance with an embodiment.

Referring to FIG. 17, yet another arrangement 650 of wind turbines 50 includes a front row 652 having five wind turbines 50 aligned perpendicular to the axis 20 of the funneled air 18. The three left-most turbines 654 rotate in a first rotational direction 656. In the exemplary embodiment, the first rotational direction 656 is clockwise. The two right-most turbines 658 rotate in a second rotational direction 660 that is opposite the first rotational direction 656. In the exemplary embodiment, the second rotational direction 660 is counter-clockwise. A second row 662 downstream of the front row 652 includes five wind turbines 50 aligned perpendicular to the axis 20 of the funneled air 18. Each turbine 50 in the second row 662 is offset from a turbine 50 in the front row 652. The three left-most turbines 664 of the second row 662 rotate in the second rotational direction 660.

The two right-most turbines 668 of the second row 662 rotate in the first rotational direction 656.

A third row 670 downstream of the second row 662 includes five wind turbines 50 aligned perpendicular to the axis 20 of the funneled air 18. Each turbine 50 in the third row 670 is offset from a turbine 50 in the second row 662. The two left-most turbines 672 of the third row 670 rotate in the first rotational direction 656. The three right-most turbines 674 of the third row 670 rotate in the second rotational direction 660. A back row 676 downstream of the third row 670 includes five wind turbines 50 aligned perpendicular to the axis 20 of the funneled air 18. Each turbine 50 in the back row 676 is offset from a turbine 50 in the third row 670. The two left-most turbines 678 of the back row 676 rotate in the second rotational direction 660. The three right-most turbines 680 of the back row 676 rotate in the first rotational direction 656.

Figure 18:
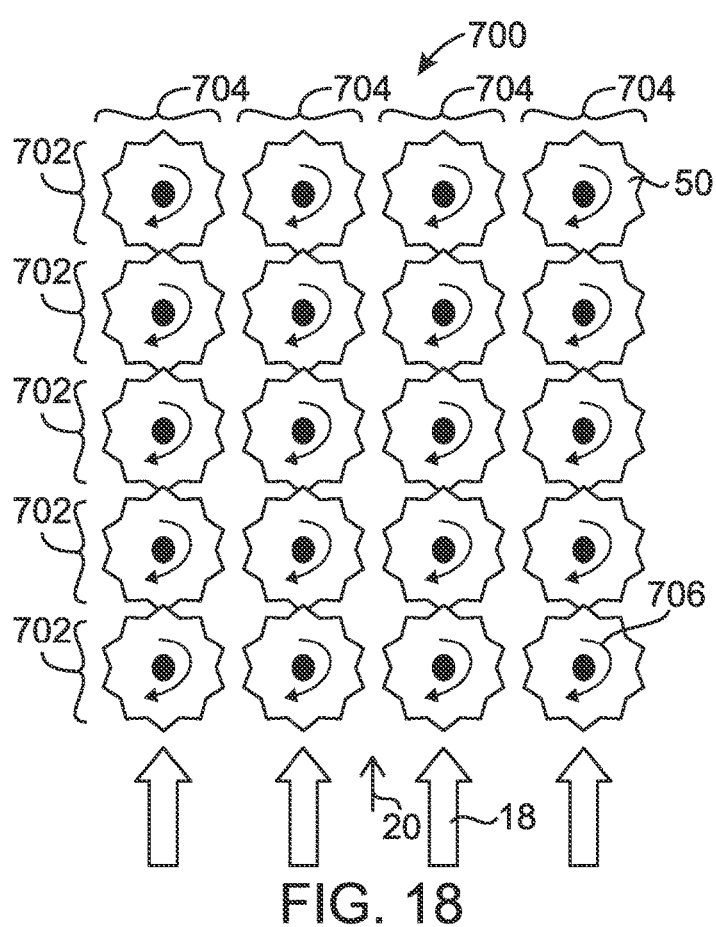
FIG. 18 is a top view of yet another embodiment of a wind turbine arrangement in accordance with an embodiment.

Referring now to FIG. 18, an arrangement 700 of wind turbines 50 includes five rows 702 of wind turbines 50 each containing four wind turbines 50. Each of the five rows 702 of wind turbines 50 are aligned perpendicular to the axis 20 of the funneled air 18. The turbines 50 in each row 702 form four columns 704 of wind turbines 50, wherein each turbine 50 in a column 704 is aligned parallel to the axis 20 of the funneled air 18. Each of the wind turbines 50 rotates in the same rotational direction 706. In the exemplary embodiment, the rotational direction 706 is clockwise. In some embodiments, the rotational direction 706 may counter-clockwise.

Figure 19:
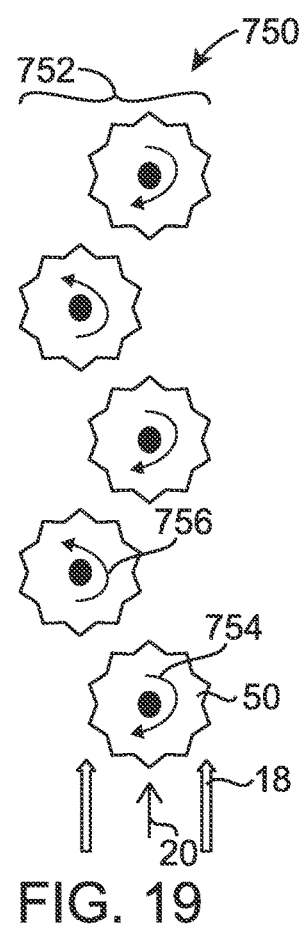
FIG. 19 is a top view of a further embodiment of a wind turbine arrangement in accordance with an embodiment.

Referring to FIG. 19, an arrangement 750 of wind turbines 50 includes a column 752 of wind turbines 50. Each wind turbine 50 in the column 752 is offset from the adjacent wind turbines 50 in the column relative to the axis 20 of the funneled air 18. Each wind turbine 50 rotates in an opposite rotational direction from the adjacent wind turbines 50 in the column 752. That is, a first wind turbine 50 rotates in a first rotational direction 754, e.g. clockwise, and the adjacent wind turbines 50 rotate in a second rotational direction 756, e.g. counter-clockwise.

Figure 20A:
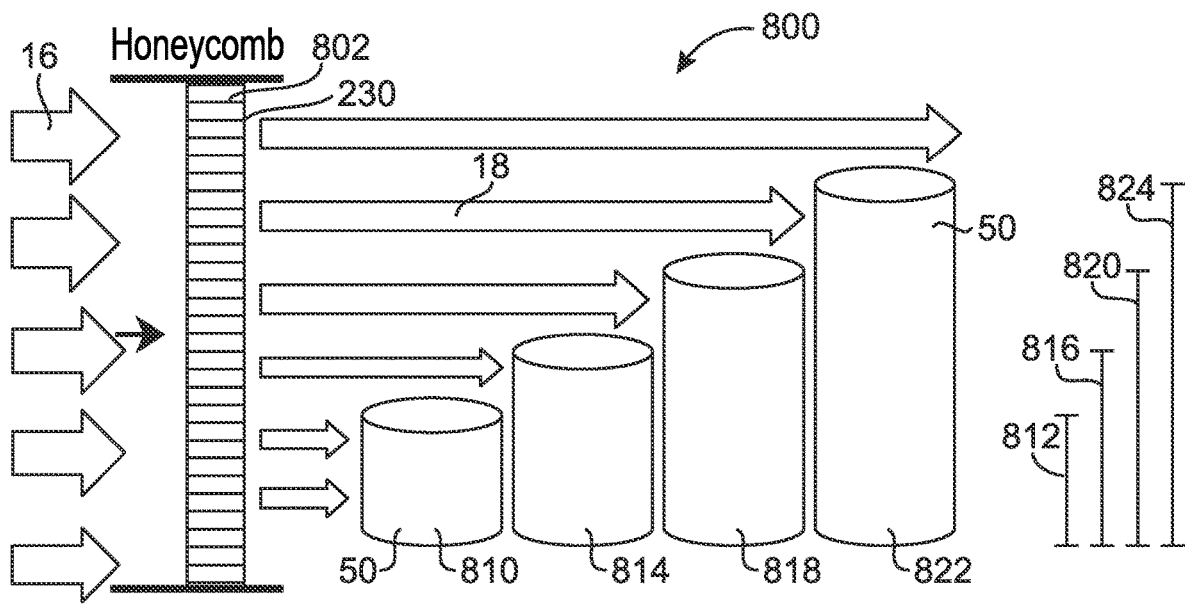
FIG. 20A is a side view of an embodiment of a wind turbine arrangement in accordance with an embodiment.

FIG. 20A illustrates another arrangement 800 of wind turbines 50 including a plurality of wind turbines 50 arranged downstream of a filter 802 having the honeycomb configuration 230. In some embodiments, the arrangement 800 does not include the filter 802. The ambient air 16 flows through the filter 802 and exits the filter 802 as funneled air 18 that passes around each of the wind turbines 50.

A front wind turbine 810 has a first height 812 and is positioned downstream of the filter 802. A second wind turbine 814 is positioned downstream of the front wind turbine 810 and has a second height 816 that is greater than the first height 812. A third wind turbine 818 is positioned downstream of the second wind turbine 814 and has a height 820 that is greater than the height 816. A rear wind turbine 822 is positioned downstream of the third wind turbine 818 and has a height 824 that is greater than the height 820.

Figure 20B:
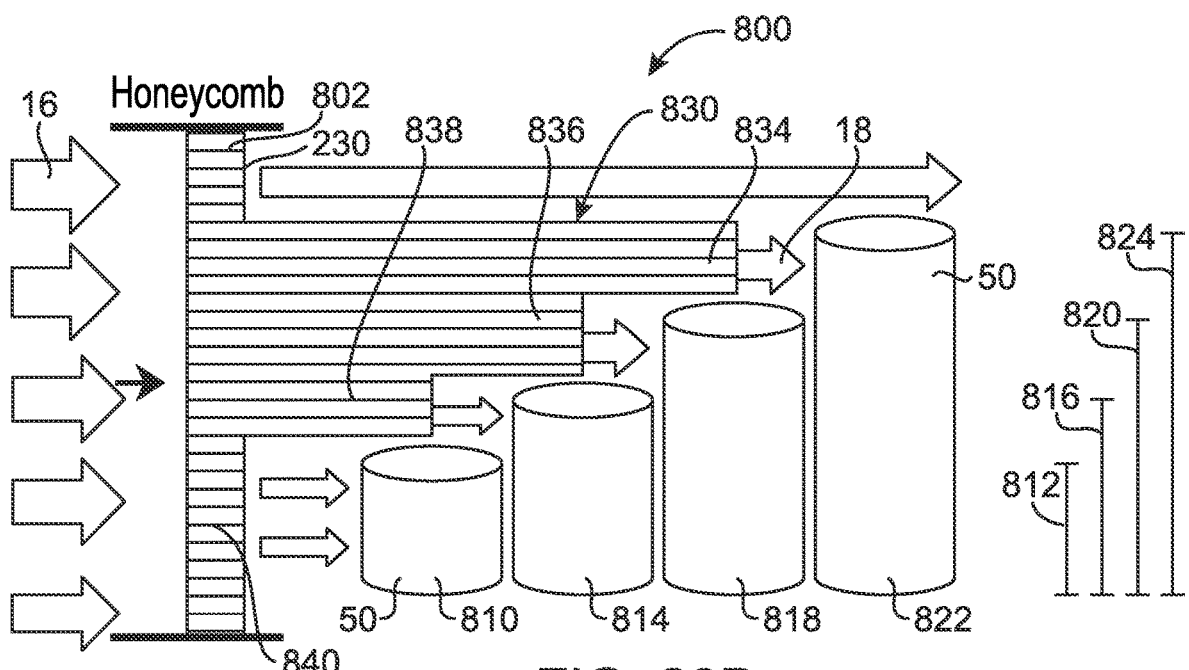
FIG. 20B is a side view of another embodiment of a wind turbine arrangement having an alternate filter.

It will be appreciated that the honeycomb configuration 230 may include channels 830 that vary in length depending on a position of a of the wind turbines 50. For example, as illustrated in FIG. 20B, channels 834 extend over the third wind turbine 818 to a position adjacent the rear wind turbine 822. Channels 836 extend over the second wind turbine 814 to a position adjacent the third wind turbine 818. Channels 838 extend over the front wind turbine 810 to a position adjacent the second wind turbine 814. Channels 840 extend to a position adjacent the front wind turbine 810. Accordingly, the funneled air 18 from each channel 830 flows directly to a corresponding wind turbine 50.

While FIGS. 14-20B illustrate various arrangements of wind turbines 50, it will be appreciated that the wind turbines 50 may be positioned in any arrangement that facilitates capturing air flow.

Figure 21A:
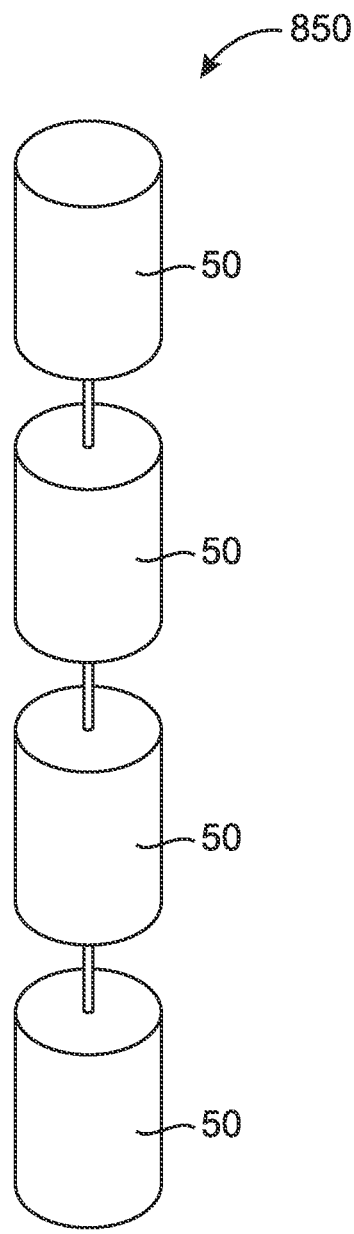
FIG. 21A is a side view of a vertical stack of wind turbines for outdoor use.
Figure 21B:
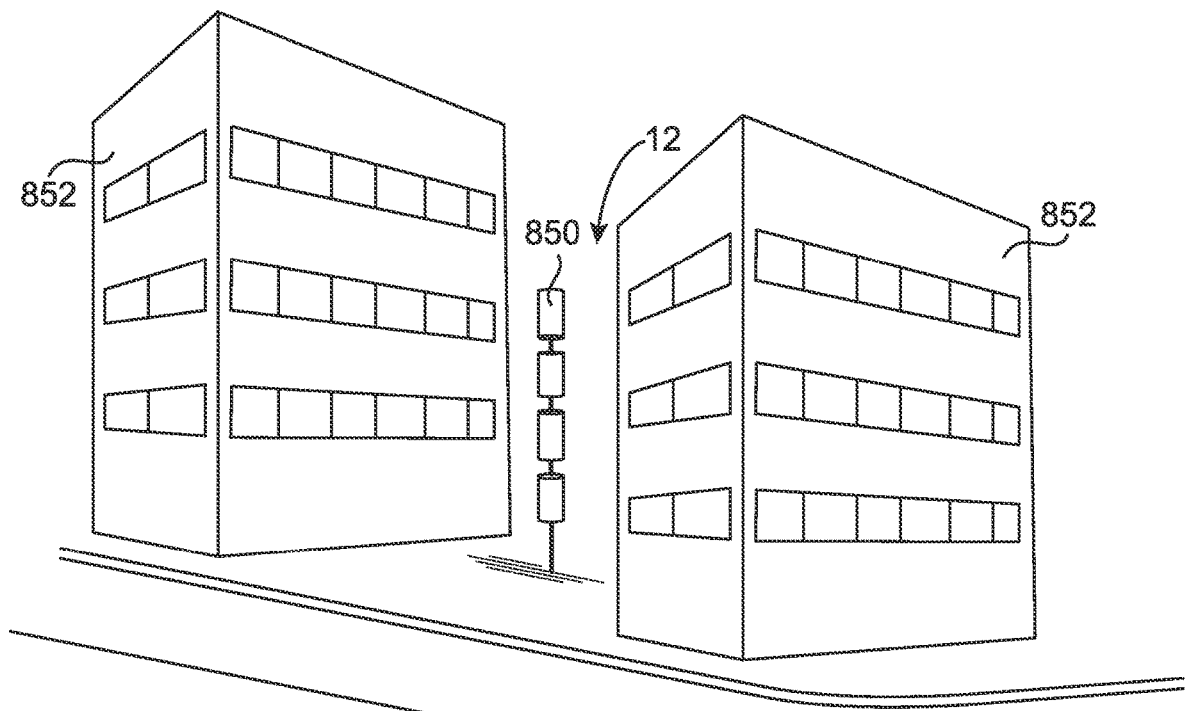
FIG. 21B is a perspective view of the vertical stack of wind turbines shown in FIG. 21A positioned on the top of an existing structure.
Figure 21C:
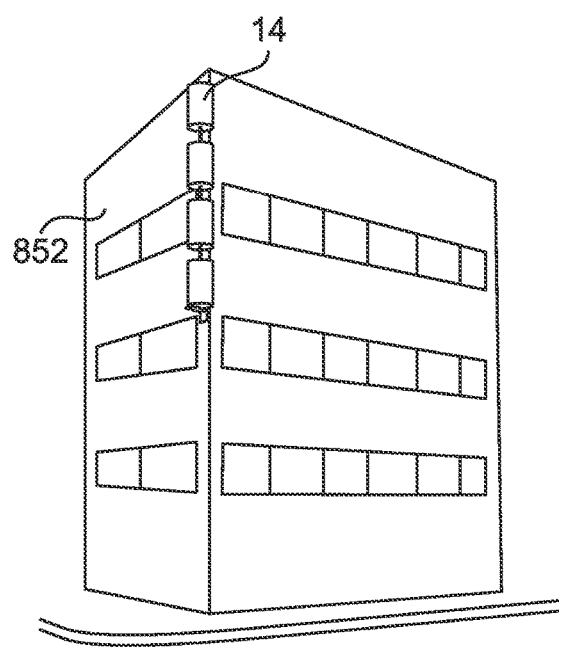
FIG. 21C is a perspective view of an electricity generator positioned on an existing building

FIG. 21A illustrates a vertical arrangement 850 of wind turbines 50 for outdoor use. Each wind turbine 50 is a certain height and rotates independently of the other wind turbines 50. Accordingly, different wind speeds at different heights rotate the individual wind turbines 50 at its own rate. In some embodiments, a plurality of arrangements 850 may be positioned in an area that currently has one windmill type wind turbine and may lead to greater energy generation. When used in a building, each arrangement 850 may be on its own floor of the building to cause different wind speeds at different heights to rotate the individual wind turbines 50 at their own rate. The arrangement 850 may be built into the building structure or may be built separate but next to the building. In some embodiments, the wind tunnel 12 may comprise a preexisting structure and/or structures 852, e.g., a building, a series of buildings, and/or the fluid passageways there between, as illustrated in FIG. 21B. In some embodiments, as illustrated in FIG. 21C, the turbine chamber 14 is placed/located on the preexisting structure 852.

Figure 22:
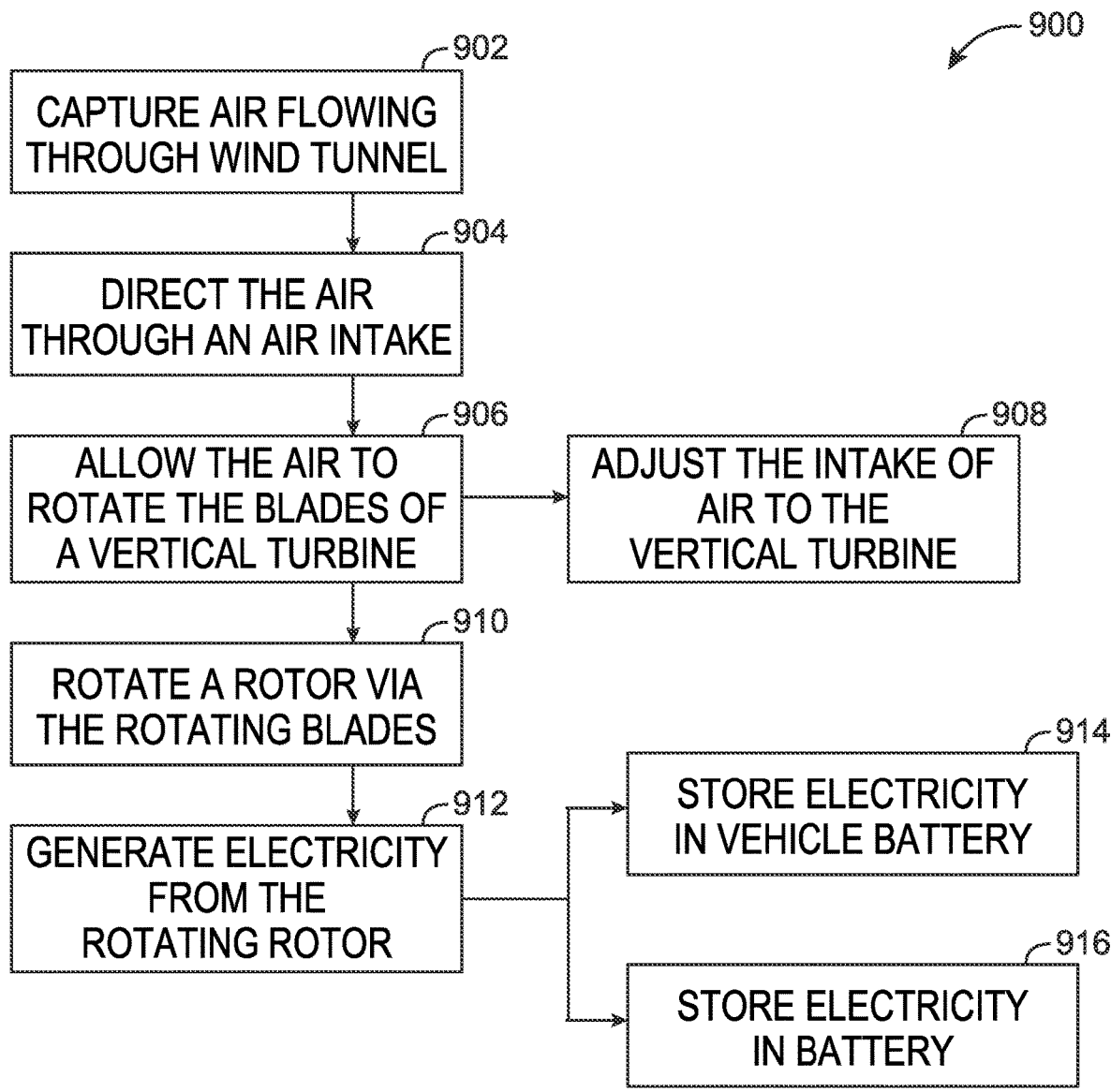
FIG. 22 is a block diagram of a method of utilizing energy produced by an electricity generator.

Referring now to FIG. 22 a method 900 of generating electricity is depicted. Method 900 includes capturing ambient air 16 flowing near, by, or over the vehicle 100, at block 902. In some embodiments, the system 10 is not positioned in the vehicle 100. In such embodiments, the system 10 is a stand-alone system that captures ambient air 16 flowing near, by, or over the system 10. At block 904, the air is directed through the wind tunnel 12 to generate funneled air 18. The funneled air 18 rotates the blades 58 of the wind turbine 50, at block 906. In some embodiments, the panels 92 are adjusted, at block 908, to adjust the amount of funneled air 18 that arrives at the wind turbine 50 to facilitate maximizing an efficiency of the wind turbine 50. At block 910, the rotor 56 is rotated via the rotating blades 58 to generate electricity from an electro-magnetic interaction between the rotating rotor 56 and the stator, at block 912. In one embodiment, the generated electricity is stored in the battery 106 of the vehicle 100, at block 914. In another embodiment, the electricity is stored in a battery 106 that is separate from the vehicle 100, at block 916. Accordingly, the stored electricity may be sold or transmitted to a power grid. In some embodiments, the stored electricity may be utilized to power other devices.

Figure 23:
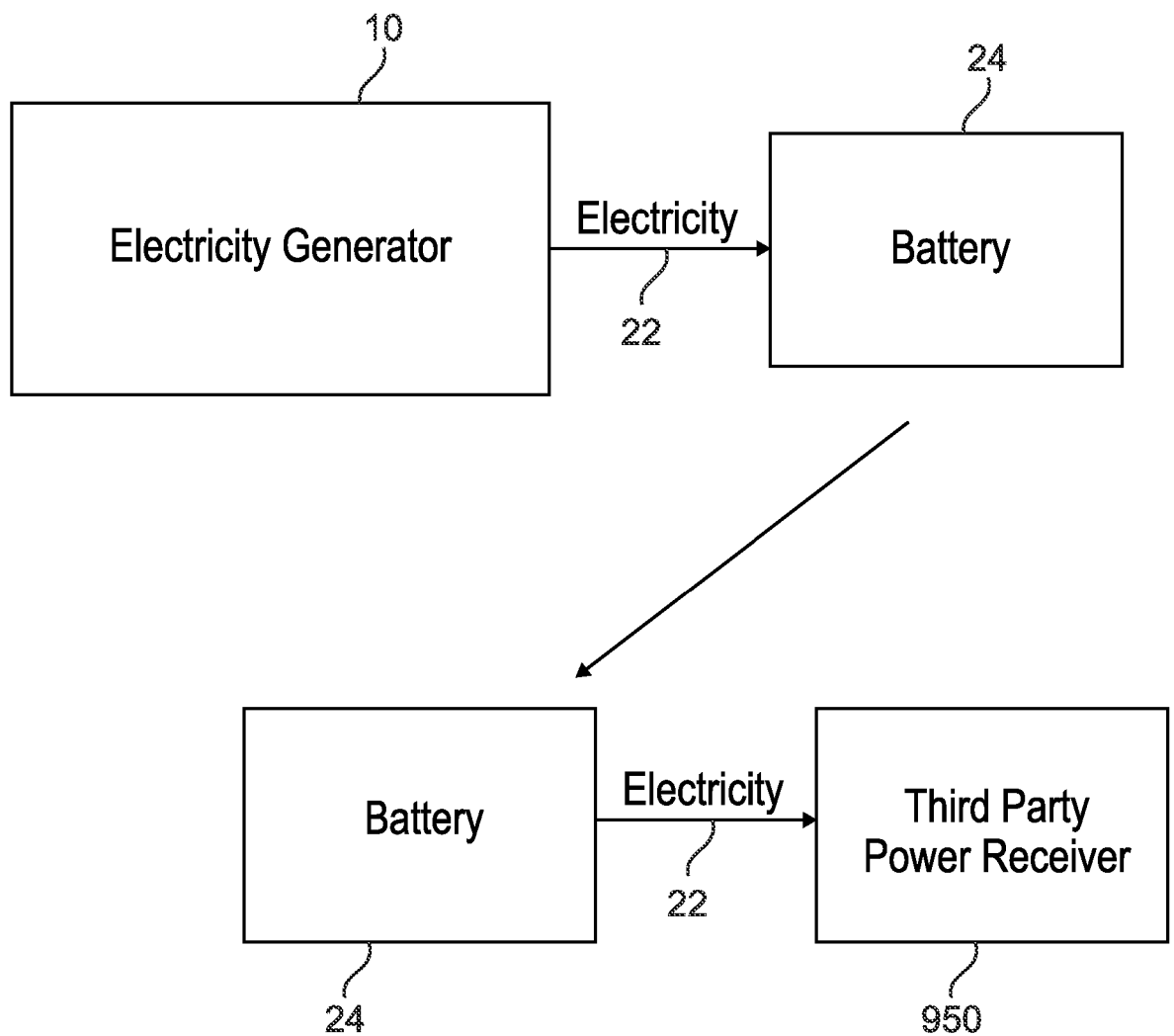
FIG. 23 is a schematic view of an electricity generator storing electricity in a battery, wherein the battery then provides the electricity to a third party power receiver.
Figure 24:
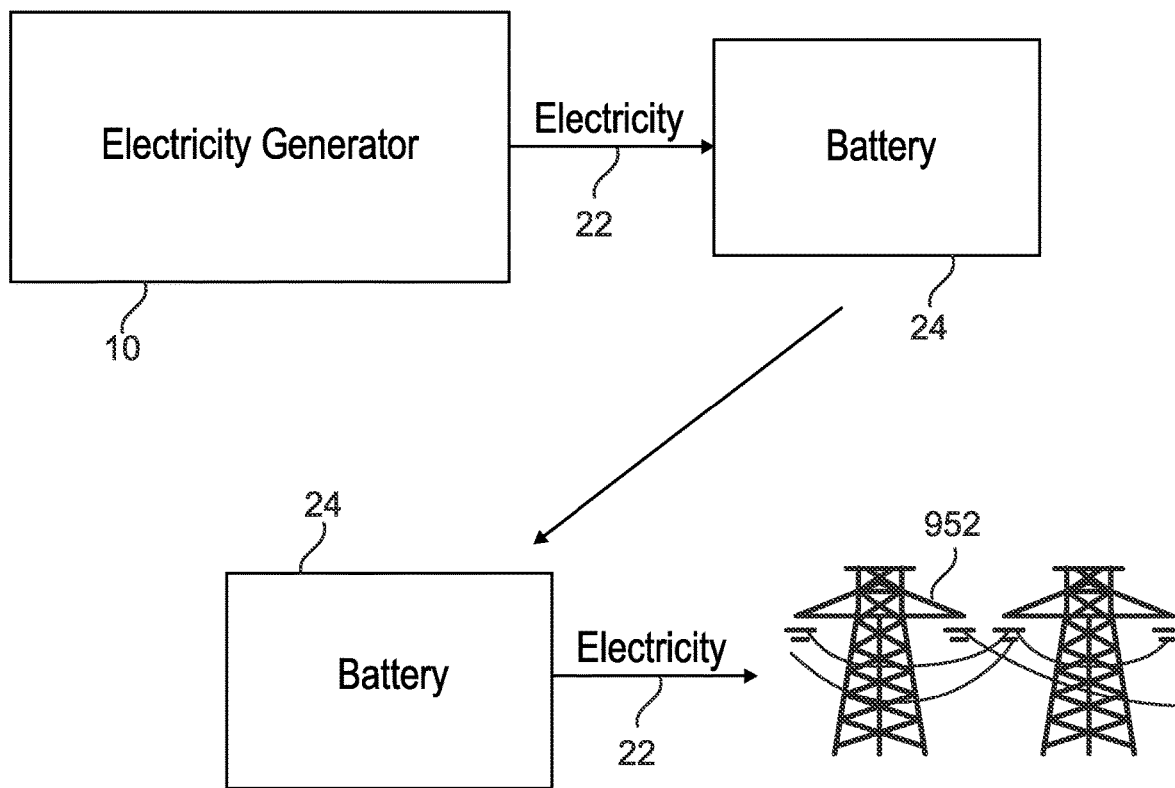
FIG. 24 is a schematic view of an electricity generator storing electricity in a battery, wherein the battery then provides the electricity to a power grid.
Figure 25:
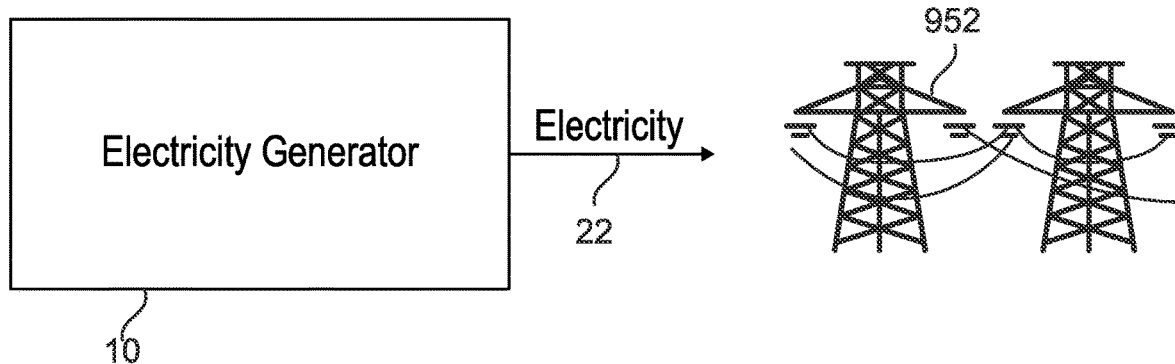
FIG. 25 is a schematic view of an electricity generator delivering electricity directly to a power grid.

Referring now to FIGS. 23-25, the electricity generator 10 is configured to generate electricity 22 that may be stored in the battery 24, as shown in FIGS. 23 and 24. As illustrated in FIG. 23, the battery 24 may then be coupled to a third party power receiver 950 to supply the electricity 22 to the third party power receiver 950. Alternatively, as illustrated in FIG. 24, the battery 24 may be coupled to a power grid 952 to supply the electricity 22 to the power grid 952. In some embodiments, as illustrated in FIG. 25, the electricity generator 10 is coupled directly to the power grid 952 to supply the electricity 22 to the power grid 952. In some embodiments, the energy generated by the electricity generators 10 described herein may be converted into carbon credits and traded on available carbon credit trading exchanges.

Figure 26:
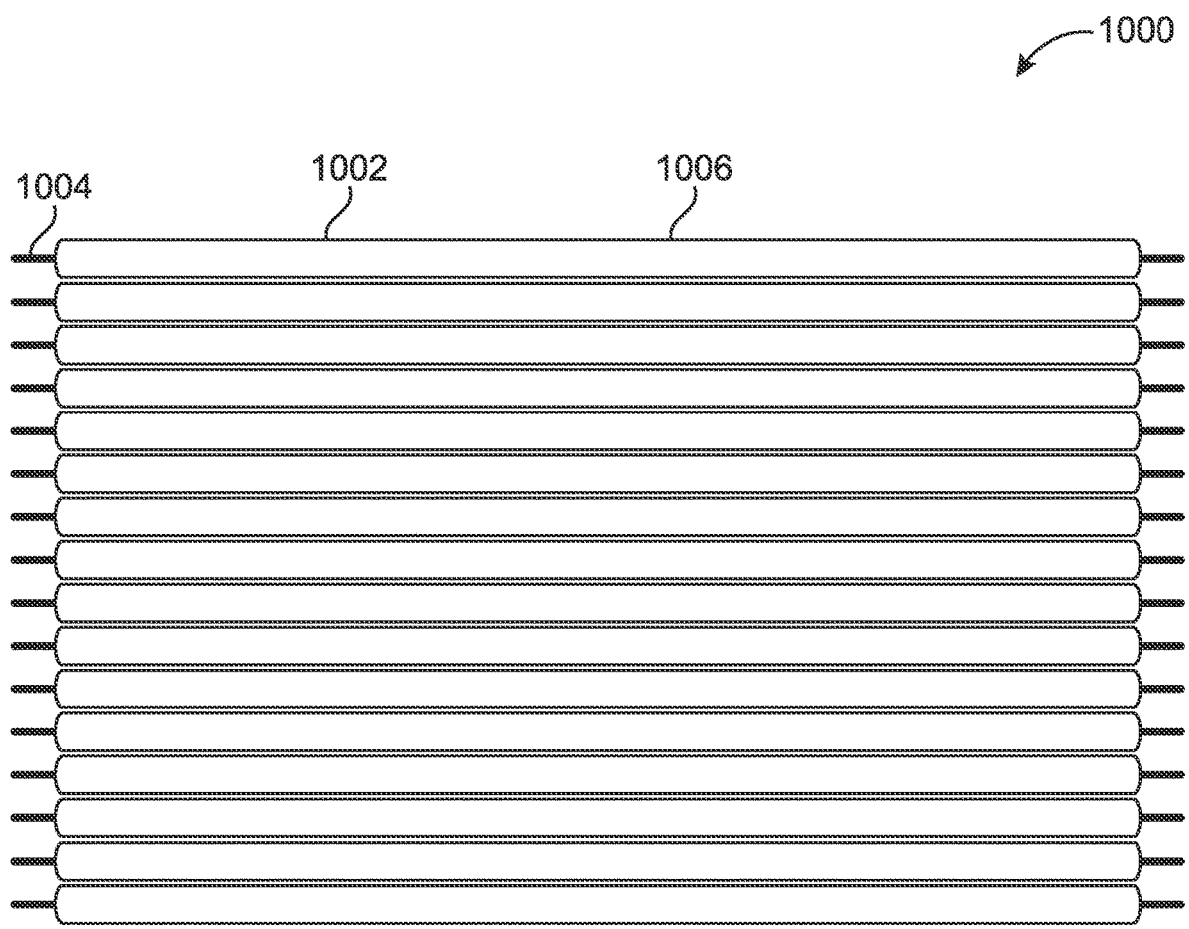
FIG. 26 is a front view of an embodiment of a series of horizontal wind turbines.

Referring to FIG. 26, an electricity generator 1000 includes a plurality of horizontal wind turbines 1002, each including a stator 1004 and a rotor 1006. It will be appreciated that the electricity generator 1000 may include any number of wind turbines 1002. In some embodiments, the wind turbines 1002 take the form of any wind turbine described in FIGS. 7-13. In some embodiments, the wind turbines 1002 may take any horizontal configuration that corresponds to the configurations described in FIGS. 14-19. The electricity generator 1000 may incorporate a wind tunnel, as described herein. The electricity generator 1000 may be utilized to replace the use of existing wind turbines or may be utilized in a vehicle, as described herein.

Figure 27A:
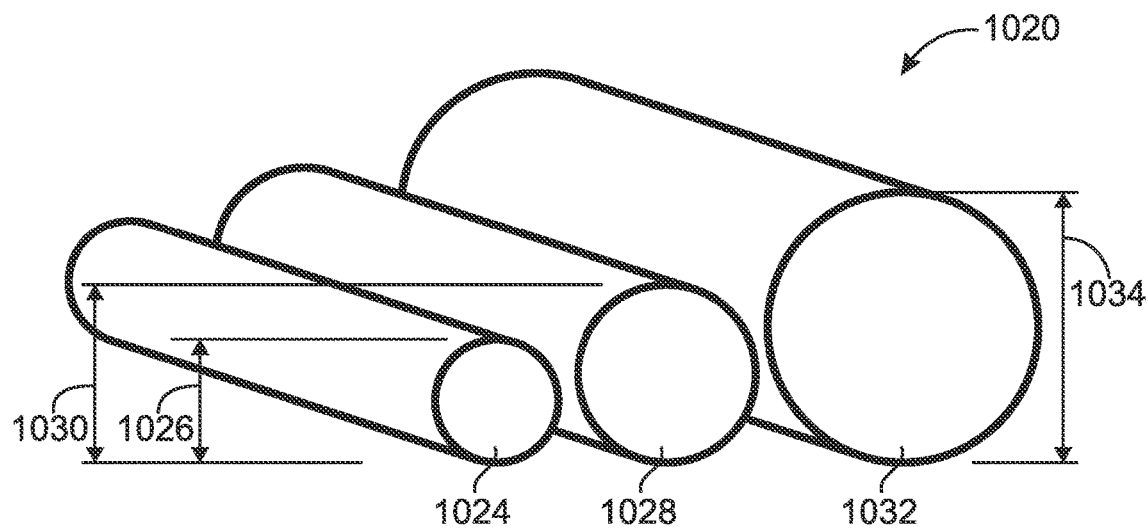
FIG. 27A is a front perspective view of an embodiment of an electricity generator having horizontal wind turbines.
Figure 27B:
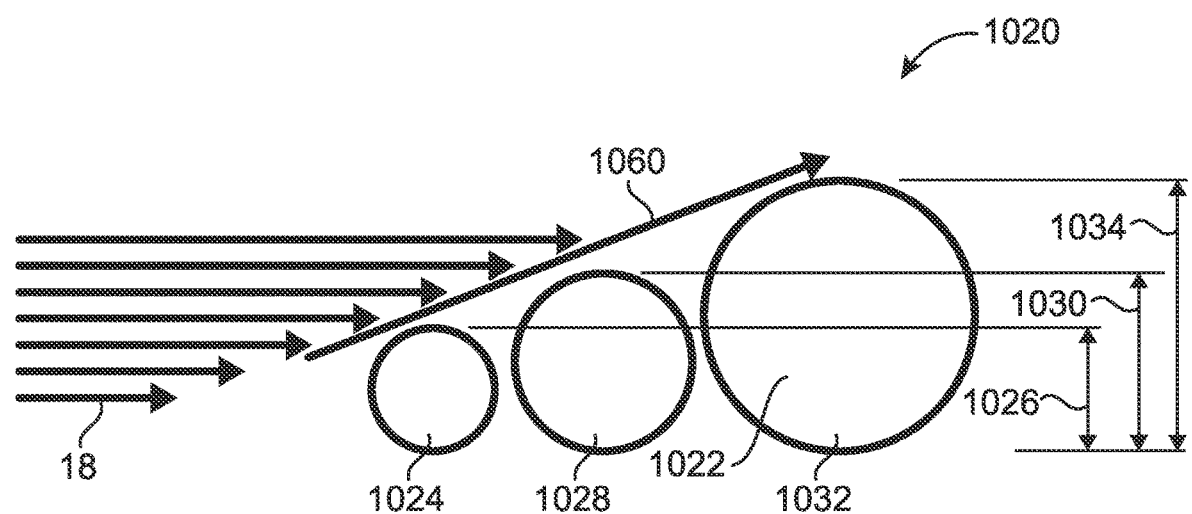
FIG. 27B is a side view of the electricity generator shown in FIG. 27A.

Referring now to FIGS. 27A and 27B, an electricity generator 1020 includes a plurality of horizontal wind turbines 1022. It will be appreciated that the electricity generator 1020 may include any number of wind turbines 1022. In some embodiments, the wind turbines 1022 take the form of any wind turbine described in FIGS. 7-13. A front wind turbine 1024 has a circumference 1026. A middle wind turbine 1028 downstream of the front wind turbine 1024 has a circumference 1030 that is greater than the circumference 1026. A rear wind turbine 1032 downstream of the middle wind turbine 1028 had a circumference 1034 that is greater than the circumference 1030. Funnel air 18 deflects off of the horizontal wind turbines 1022 as deflected air 1060 and flows from the front wind turbine 1024, over the middle wind turbine 1028, and over the rear wind turbine 1032.

It will be appreciated that in some embodiment, the generator 10 may be a stand-alone individual units to compete with wind farms. Such a unit is configured to be used in high wind open areas as well as on buildings. The generator 10 includes a vertical axis wind turbine electricity generator 50, where gravitational friction is reduced or eliminated using magnetic force to facilitate maximizing rotational velocity and duration of rotation and, therefore, generation of electricity. The wind turbine 50 is configured with a contoured surface area designed to facilitate maximizing rotational speed as wind passes over the surface. Single generators 10 or a series of generators 10 may be used in vehicles to increase a driving range of vehicle before recharge or refueling. A single wind turbine 50 or a set of wind turbines 50 in a portable structure may be used in vehicles. A wind tunnel 12 directs the airflow to the wind turbine 50 to facilitate increasing a velocity of the airflow from the wind tunnel 12 to a point of contact with the wind turbine 50 to direct the increased velocity air over the surface of the wind tunnel 50. The wind tunnel 12 includes panels 92 that are movable to allow airflow to enter the generator 10 when desired to facilitate maximizing electricity generating efficiency. The generator 10 is designed for ease of replacement of component parts and replacement of entire generator 10.

In some embodiments, the generator 10 may be used on the exterior of buildings, as described above. Additionally, the generator 10 may be used on elevators or in elevator shafts to catch wind as the elevator passes the generator 10. In other embodiments, the generator 10 may be used on railroads, for example on the walls of railroad tunnels. A series of generators 10 may be positioned alongside the railroad track at high speed locations to catch wind and rotate. For example, a plurality of generators 10 may be positioned alongside any length of railroad track, e.g. miles of railroad track. Similarly, a plurality of generators 10 may be positioned alongside subway tracks and in subway tunnels. In some embodiments, the wind tunnel may be any naturally occurring wind tunnel, as described above.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless cannot be necessary and embodiments lacking the same can be contemplated as within the scope of the disclosure, that scope being defined by the claims that follow.

In reading the claims it is intended that when words such as "a," "an," "at least one," "at least a portion" are used there is no intention to limit the claim to only one item unless specifically stated to the contrary in the claim. When the language "at least a portion" and/or "a portion" is used the item can include a portion and/or the entire item unless specifically stated to the contrary.

It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations can be apparent to those skilled in the art. Also, while multiple inventive aspects and principles can have been presented, they need not be utilized in combination, and many combinations of aspects and principles are possible in light of the various embodiments provided above.

In summary, the embodiments include the elements of each of the following clauses:
1. An electricity generator for a vehicle comprising:
   a wind tunnel positioned on the vehicle, the wind tunnel having an open first end and an open second end, wherein the open first end is in communication with ambient air,
   a turbine chamber fluidly coupled to the open second end of the wind tunnel, and at least one wind turbine positioned in the turbine chamber, the at least one wind turbine including:
   a stator having an electrical coil, and
   a rotor positioned around the stator and extending along an axis that is substantially perpendicular to an axis of the wind tunnel, the rotor having at least one magnet,
   wherein ambient air enters the wind tunnel through the open first end and the wind tunnel channels the ambient air into the turbine chamber as funneled air in a direction that is substantially perpendicular to the axis of the rotor, wherein the funneled air rotates the rotor to create an electrical charge between the electrical coil and the at least one magnet.
2. The generator of clause 1, wherein the electrical charge is delivered to a battery of the vehicle.
3. The generator of clause 1, wherein the electrical charge is delivered to a battery and stored in the battery.
4. The generator of clause 1, further comprising at least one blade coupled to the rotor, wherein the funneled air creates a force against the at least one blade to rotate the rotor.
5. The generator of clause 1, further comprising a contoured surface on an outer surface of the rotor, wherein the funneled air creates a force against the contoured surface to rotate the rotor.
6. The generator of clause 1, wherein the wind tunnel further comprises a filter having a plurality of openings in a honeycomb pattern.

7. The generator of clause 1, wherein a portion of the wind tunnel is curved between a first end and a second end.
8. The generator of clause 1, wherein the at least one wind turbine includes a plurality of wind turbines.
9. The generator of clause 8, wherein the plurality of wind turbines includes a first wind turbine and a second wind turbine that is offset from the first wind turbine relative to the axis of the wind tunnel.
10. The generator of clause 8, wherein the plurality of wind turbines includes a first wind turbine positioned at a first height and a second wind turbine positioned at a second height that is greater than the first height.
11. The generator of clause 10, wherein the second wind turbine is positioned downstream of the first wind turbine.
12. The generator of clause 11, wherein the generator is retrofit onto an existing vehicle.
13. The generator of clause 1, wherein the wind tunnel is positioned at a front end of the vehicle.
14. The generator of clause 1, wherein the wind tunnel is positioned along a side of the vehicle.
15. The generator of clause 1, wherein the wind tunnel is positioned on an undercarriage of the vehicle.
16. The generator of clause 1, wherein the wind turbine facilitates reducing gravitational friction between the rotor and the housing using magnetic force.
17. The generator of clause 16, wherein the wind turbine facilitates increasing rotational velocity and duration of rotation of the rotor to facilitate increasing the generation of electrical charge.
18. The generator of clause 1, wherein the wind tunnel facilitates increasing a velocity of the funneled air.
19. The generator of clause 1, further comprising panels on the open first end of the wind tunnel, wherein the panels are movable to adjust a flow of the ambient air into the wind tunnel.
20. The generator of clause 19, further comprising sensors to control movement of the panels.
21. The generator of clause 19, wherein the panels are moved to an open position when the vehicle is at least one of braking or not accelerating.
22. A method of utilizing energy produced by an electricity generator, the method comprising:
collecting ambient air through an open end of a wind tunnel,
funneling the ambient air into a turbine chamber as funneled air, wherein the turbine chamber includes at least one wind turbine, wherein the at least one wind turbine includes a stator having an electrical coil and a rotor positioned around the stator and extending along an axis that is substantially perpendicular to an axis of the wind tunnel, the rotor having at least one magnet,
passing the funneled air along the rotor in a direction that is substantially perpendicular to the axis of the rotor,
rotating the rotor with the funneled air to create an electrical charge between the electrical coil and the at least one magnet, and
storing the electrical charge in a battery.
23. The method of clause 22, wherein the wind tunnel and the turbine chamber are positioned on a vehicle, and the method includes collecting the ambient air while the vehicle is moving.
24. The method of clause 23, further comprising positioning the wind tunnel at a front end of the vehicle.
25. The method of clause 23, further comprising positioning the wind tunnel along a side of the vehicle.
26. The method of clause 23, further comprising positioning the wind tunnel on an undercarriage of the vehicle.
27. The method of clause 23, further comprising collecting the ambient air when the vehicle is at least one of braking or not accelerating.
28. The method of clause 22, further comprising reducing gravitational friction between the rotor and the housing using magnetic force.
29. The method of clause 22, further comprising increasing rotational velocity and duration of rotation of the rotor to facilitate increasing the generation of electrical charge.
30. The method of clause 22, further comprising increasing a velocity of the funneled air with the wind tunnel.
31. The method of clause 22, further moving panels on the open end of the wind tunnel to adjust a flow of the ambient air into the wind tunnel.
32. The method of clause 22, further comprising controlling the movement of the panels with a sensor.
33. The method of clause 22, further comprising delivering electricity generated by the electricity generator to a power grid.
34. An electricity generator comprising:
a wind tunnel having an open first end and an open second end, wherein the open first end is in communication with ambient air,
a turbine chamber fluidly coupled to the open second end of the wind tunnel, and
at least one wind turbine positioned in the turbine chamber, the at least one wind turbine including:
a stator having an electrical coil, and
a rotor positioned around the stator and extending along an axis that is substantially perpendicular to an axis of the wind tunnel, the rotor having at least one magnet,
wherein ambient air enters the wind tunnel through the open first end and the wind tunnel channels the ambient air into the turbine chamber as funneled air in a direction that is substantially perpendicular to the axis of the rotor, wherein the funneled air rotates the rotor to create an electrical charge between the electrical coil and the at least one magnet.
35. The generator of clause 34, wherein the electrical charge is delivered to a battery and stored in the battery.
36. The generator of clause 34, further comprising at least one blade coupled to the rotor, wherein the funneled air creates a force against the at least one blade to rotate the rotor.
37. The generator of clause 34, further comprising a contoured surface on an outer surface of the rotor, wherein the funneled air creates a force against the contoured surface to rotate the rotor.
38. The generator of clause 34, wherein the wind tunnel further comprises a filter having a plurality of openings in a honeycomb pattern.
39. The generator of clause 34, wherein a portion of the wind tunnel is curved between a first end and a second end.
40. The generator of clause 34, wherein the at least one wind turbine includes a plurality of wind turbines.
41. The generator of clause 40, wherein the plurality of wind turbines includes a first wind turbine and a second wind turbine that is offset from the first wind turbine relative to the axis of the wind tunnel.
42. The generator of clause 40, wherein the plurality of wind turbines includes a first wind turbine positioned at a first height and a second wind turbine positioned at a second height that is greater than the first height.

43. The generator of clause 40, wherein the second wind turbine is positioned downstream of the first wind turbine.

44. The generator of clause 34, wherein the wind turbine facilitates reducing gravitational friction between the rotor and the housing using magnetic force.

45. The generator of clause 44, wherein the wind turbine facilitates increasing rotational velocity and duration of rotation of the rotor to facilitate increasing the generation of electrical charge.

46. The generator of clause 34, wherein the wind tunnel facilitates increasing a velocity of the funneled air.

47. The generator of clause 34, further comprising panels on the open first end of the wind tunnel, wherein the panels are movable to adjust a flow of the ambient air into the wind tunnel.

48. The generator of clause 47, further comprising sensors to control movement of the panels.

49. The generator of clause 34, further comprising a pair of magnets, wherein the rotor is magnetically suspended between the pair of magnets relative to the stator.

50. The generator of clause 34, wherein the wind tunnel is a naturally occurring wind tunnel.

The invention claimed is:

1. An electricity generating system for a vehicle comprising:
a plurality of wind tunnels positioned on the vehicle, each of the plurality of wind tunnels having an open first end and an open second end, wherein the open first end is in communication with ambient air, and wherein each of the plurality of wind tunnels is configured to direct the ambient air from the open first end to the open second end as funneled air;
a turbine chamber fluidly coupled to the open second end of each of the plurality of wind tunnels,
a plurality of wind turbines positioned in the turbine chamber, wherein each of the plurality of wind turbines comprises an independent rotor and an independent stator, wherein each independent rotor has a height which is different than heights of a remainder of the plurality of wind turbines and wherein each independent rotor comprises a magnet and each independent stator comprises an electrical coil, wherein the funneled air rotates each independent rotor to create an electrical charge.

2. The electricity generating system of claim 1, further comprising a panel associated with the open first end of at least one of the plurality of wind tunnels, wherein the panel is configured to adjust a flow of the ambient air into the at least one of the plurality of wind tunnels.

3. The electricity generating system of claim 1, wherein at least one of the plurality of wind tunnels further comprises a filter having a plurality of openings.

4. The electricity generating system of claim 2, wherein the at least one of the plurality of wind tunnels further comprises a filter having a plurality of openings.

5. The electricity generating system of claim 2, further comprising a sensor configured to control a movement of the panel.

6. The electricity generating system of claim 4, further comprising a sensor configured to control a movement of the panel.

7. The electricity generating system of claim 2, wherein the at least one of the plurality of wind tunnels is configured to cause a velocity of the funneled air to be greater than a velocity of the ambient air.

8. The electricity generating system of claim 3, wherein the at least one of the plurality of wind tunnels is configured to cause a velocity of the funneled air to be greater than a velocity of the ambient air.

9. The electricity generating system of claim 4, wherein the at least one of the plurality of wind tunnels is configured to cause a velocity of the funneled air to be greater than a velocity of the ambient air.

10. The electricity generating system of claim 5, wherein the at least one of the plurality of wind tunnels is configured to cause a velocity of the funneled air to be greater than a velocity of the ambient air.

11. The electricity generating system of claim 6, wherein the at least one of the plurality of wind tunnels is configured to cause a velocity of the funneled air to be greater than a velocity of the ambient air.

12. The electricity generating system of claim 7, further comprising increasing rotational velocity and duration of rotation of each independent rotor to increase an amount of the electrical charge.

13. The electricity generating system of claim 8, further comprising increasing rotational velocity and duration of rotation of each independent rotor to increase an amount of the electrical charge.

14. The electricity generating system of claim 9, further comprising increasing rotational velocity and duration of rotation of each independent rotor to increase an amount of the electrical charge.

15. The electricity generating system of claim 10, further comprising increasing rotational velocity and duration of rotation of each independent rotor to increase an amount of the electrical charge.

16. The electricity generating system of claim 11, further comprising increasing rotational velocity and duration of rotation of each independent rotor to increase an amount of the electrical charge.

17. The electricity generating system of claim 1, wherein the electrical charge is delivered to a battery of the vehicle.

18. An electricity generating system comprising:
a plurality of wind tunnels, each of the plurality of wind tunnels having an open first end and an open second end, wherein the open first end is in communication with ambient air, and wherein each of the plurality of wind tunnels is configured to direct the ambient air from the open first end to the open second end as funneled air;
a turbine chamber fluidly coupled to the open second end of each of the plurality of wind tunnels,
a plurality of wind turbines positioned in the turbine chamber, wherein each of the plurality of wind turbines comprises an independent rotor and an independent stator, wherein each independent rotor has a height which is different than heights of a remainder of the plurality of wind turbines and wherein each independent rotor comprises a magnet and each independent stator comprises an electrical coil, wherein the wind funneled air rotates each dependent rotor to create an electrical charge.

19. The electricity generating system of claim 18, wherein at least one of the plurality of wind tunnels further comprises a filter having a plurality of openings.

20. An electricity generating system for a vehicle comprising:

a plurality of wind tunnels positioned on the vehicle, each of the plurality of wind tunnels having an open first end and an open second end, wherein the open first end is in communication with ambient air, and wherein each of the plurality of wind tunnels is configured to direct the ambient air from the open first end to the open second end as funneled air;

a turbine chamber fluidly coupled to the open second end of each of the plurality of wind tunnels, a plurality of wind turbines positioned in the turbine chamber, wherein each of the plurality of wind turbines comprises a rotor and a stator, wherein each of the plurality of wind turbines has a height which is different than heights of a remainder of the plurality of wind turbines and wherein the rotor comprises a magnet and the stator comprises an electrical coil, wherein the funneled air rotates the rotor of each of the plurality of wind turbines to create an electrical charge.

\* \* \* \* \*